US008055574B2

(12) United States Patent
Cutler et al.

(10) Patent No.: US 8,055,574 B2
(45) Date of Patent: Nov. 8, 2011

(54) SECURITIES MARKET AND MARKET MAKER ACTIVITY TRACKING SYSTEM AND METHOD

(75) Inventors: Stephen Cutler, Fort Myers, FL (US); William MacKenzie, III, Golden, CO (US)

(73) Assignee: Stephen Cutler, Captiva, FL (US)

( * ) Notice: Subject to any disclaimer, the term of this patent is extended or adjusted under 35 U.S.C. 154(b) by 0 days.

(21) Appl. No.: 12/901,743

(22) Filed: Oct. 11, 2010

(65) Prior Publication Data

US 2011/0029423 A1 Feb. 3, 2011

Related U.S. Application Data

(62) Division of application No. 10/783,538, filed on Feb. 20, 2004, now Pat. No. 7,827,091.

(51) Int. Cl.
*G06Q 40/00* (2006.01)
(52) U.S. Cl. ............................. 705/37; 705/35; 705/36 R
(58) Field of Classification Search ................. 705/35, 705/36 R, 37
See application file for complete search history.

(56) References Cited

U.S. PATENT DOCUMENTS

| 5,101,353 | A | 3/1992 | Lupien et al. |
| 5,132,899 | A | 7/1992 | Fox |
| 5,214,579 | A | 5/1993 | Wolfberg et al. |
| 5,270,922 | A | 12/1993 | Higgins |
| 5,297,031 | A | 3/1994 | Gutterman et al. |
| 5,297,032 | A | 3/1994 | Trojan et al. |
| 5,339,392 | A | 8/1994 | Risberg et al. |
| 5,689,651 | A | 11/1997 | Lozman |
| 5,761,442 | A | 6/1998 | Barr et al. |
| 5,819,238 | A | 10/1998 | Fernholz |
| 5,857,176 | A | 1/1999 | Ginsberg |
| 5,946,666 | A | 8/1999 | Nevo et al. |
| 5,963,923 | A | 10/1999 | Garber |
| 6,006,206 | A | 12/1999 | Smith et al. |
| 6,012,046 | A | 1/2000 | Lupien et al. |
| 6,014,643 | A | 1/2000 | Minton |
| 6,016,483 | A | 1/2000 | Rickard et al. |
| 6,018,722 | A | 1/2000 | Ray et al. |
| 6,029,146 | A | 2/2000 | Hawkins et al. |
| 6,035,286 | A | 3/2000 | Fried |
| 6,041,313 | A | 3/2000 | Gilbert et al. |
| 6,049,782 | A | 4/2000 | Gottesman et al. |
| 6,061,663 | A | 5/2000 | Bloom et al. |
| 6,064,985 | A | 5/2000 | Anderson |
| 6,128,602 | A | 10/2000 | Northington et al. |

(Continued)

FOREIGN PATENT DOCUMENTS

JP 07296057 11/1995

(Continued)

OTHER PUBLICATIONS

Labier, M.R., "The Nasdaq Trader's Toolkit", John Wiley & Sons, Inc., Chapter 4, pp. 28-43, 2001.

(Continued)

*Primary Examiner* — Lalita Hamilton

(74) *Attorney, Agent, or Firm* — Renner, Otto, Boisselle & Sklar, LLP

(57) ABSTRACT

A method, system and computer program to monitor securities market activity to seek out imbalances in market activity that could lead to a price change in a particular security. Level 1 and/or level 2 data is analyzed to track the activity of market makers and to derive indicators of momentary upward or downward price pressure. The indicators can be displayed to a user.

84 Claims, 6 Drawing Sheets

U.S. PATENT DOCUMENTS

| | | | |
|---|---|---|---|
| 6,134,535 | A | 10/2000 | Belzberg |
| 6,195,647 | B1 | 2/2001 | Martyn et al. |
| 6,272,474 | B1 | 8/2001 | Garcia |
| 6,289,321 | B1 | 9/2001 | Suganuma |
| 6,317,728 | B1 | 11/2001 | Kane |
| 6,338,047 | B1 | 1/2002 | Wallman |
| 6,615,188 | B1 | 9/2003 | Breen et al. |
| 6,907,404 | B1 | 6/2005 | Li |
| 6,963,855 | B1 | 11/2005 | Borzenko |
| 7,082,410 | B1 | 7/2006 | Anaya et al. |
| 2003/0055768 | A1 | 3/2003 | Anaya et al. |
| 2003/0065608 | A1 | 4/2003 | Cutler |
| 2003/0069834 | A1 | 4/2003 | Cutler |
| 2003/0078865 | A1 | 4/2003 | Lee |
| 2003/0101125 | A1 | 5/2003 | McGill et al. |

FOREIGN PATENT DOCUMENTS

| | | |
|---|---|---|
| JP | 11224295 | 8/1998 |
| WO | 9722072 | 6/1997 |

OTHER PUBLICATIONS

Chester, Thomas and Alden, Richard H., "Mastering Excel 97", 4th ed., 1997, SYBEX Inc., pp. 254-255 and 766.

Jurik, Mark—Editor, "Computerized Trading: Maximizing Day Trading and Overnight Progits", New York Institute of Finance, Prentice Hall, (1999), pp. 47 and 72.

"Market Comeback Courtesy of Individual Investors", Final Edition, Greg Ip., The Ottawa Citizen, Ottawa, Ont., Feb. 12, 1998, pp. D4.

"Microsoft E-Business Acceleration Initiative Enables Companies of Any Size to Sell Through Any Electronic Marketplace", PR Newswire, New York, Nov. 6, 2000, pp. 1.

SECURITIES MARKET AND MARKET MAKER ACTIVITY TRACKING SYSTEM AND METHOD

RELATED APPLICATION DATA

This application is a divisional of and claims the benefit of U.S. patent application Ser. No. 10/783,538 filed Feb. 20, 2004, the disclosure of which is incorporated herein by reference in its entirety.

TECHNICAL FIELD

The present invention generally relates to real time monitoring and analysis of securities market activity, and, more particularly, to a system and method of tracking and analyzing market maker activity on a dynamic basis for a plurality of securities.

BACKGROUND ART

In a securities market, shares of stock in corporations (and options thereon), commodity futures (and options thereon), currencies and the like are traded over a common system or exchange. Other traded items can include, but are not limited to, indices and mutual funds. For simplicity, however, the following discussion will be limited to the purchase and sale of corporate stock. Within the exchange, traders buy and sell securities using bids and offers (also referred to as asks). More specifically, market makers who are selling securities transmit "offers" (or prices) and volumes (or associated volumes) at which they will sell various securities, and market makers who are buying securities transmit "bids" (or prices) and volumes (or associated volumes) at which they will buy various securities. Sellers attempt to sell at the highest possible price and buyers attempt to buy at the lowest possible price. The "inside market" represents the best price for sellers and buyers and respectively is comprised of the lowest ask (also known as the inside ask price or level 1 ask) and the highest bid (also known as the inside bid price or level 1 bid). Multiple market makers can simultaneously have an inside bid and multiple market makers can simultaneously have an inside ask. Bids and asks can collectively be referred to as orders.

To maximize the profit taken from the securities market, traders would like certain information to determine what moment is advantageous to sell or buy a particular security. Traditionally, traders have tracked information derived from the "floor" of exchanges such as the New York Stock Exchange (NYSE), the National Association of Securities Dealers (NASDAQ), the Chicago Mercantile Exchange and the like. This information can be transmitted electronically in near real time (i.e., almost simultaneously with actual market activity) to computer workstations for traders to view and analyze.

The information presently available to traders includes "level 1" information and "level 2" information. Level 1 information for a particular security typically includes, but may not be limited to, the current trade value (i.e., last trade), the current trade volume, the total volume of shares traded during the trading session, the price to earnings (P/E) ratio, the previous trading day's closing value, the present day's opening value, the high and low values for the day and for the previous fifty-two weeks, the change from the prior closing value, the lowest ask (inside ask), the highest bid (inside bid), the earnings per share, the market capitalization, the dividend paid per share, the dividend yield, news items and articles, and so forth. Also available are records of historical performance, which can be displayed graphically on a trade by trade basis or over periods of time ranging from fractions of seconds to years. Also available are statistics for an entire exchange, such as total volume of shares traded and statistics for calculated market indices, such as the Dow-Jones Industrial Average ("The DOW"), the NASDAQ Composite, the Standard and Poor's 500 ("S&P 500"), the Russell 2000, sector indices, etc.

Level 2 information for a particular security typically includes each market maker having an open (or active) bid or ask, the time when the bid or ask was placed (also referred to respectively as bid time and ask time), size of the bid or ask (i.e., number of shares, often reported in lots of 100) and price of the ask or bid.

Many traders are interested in short term upward or downward price movements for selected securities. Predicting upward and downward price movement is often carried out by observing level 2 information for trends made by market makers as they offer and bid shares of various securities. Typically, level 2 information for one to three securities will be displayed on a computer monitor and this information is intently watched by the traders. The number of securities an individual can track in this manner is limited by the memory and cognitive ability of the individual to assimilate up to tens or hundreds of dynamically updated items of information per security per second. As a result, most traders can only effectively track one security at a time. More skilled traders may be able to track several securities at a time. Nevertheless, this technique is physically and mentally taxing on the trader. In addition, while a trader is tracking one or two securities, a purchase or sell opportunity for a different, untracked security may have been missed.

At least one attempt to automate the analysis of level 2 information has been made. As discussed in U.S. Pat. No. 5,297,032, market depth for a watch list of securities is displayed by identifying the total number of market makers on the inside market for respective bid and offer quotes for each watch list security along with arrows to indicate whether the number of market makers at these prices is increasing, staying the same or decreasing. However, this system does not provide adequate information for a trader to make a decision as to the appropriateness of purchasing or selling a particular security.

Accordingly, there exists a need in the art for a more sophisticated securities and market maker activity tracking system than the prior art provides.

SUMMARY OF THE INVENTION

According to one aspect of the invention, the invention is directed to a method of tracking activity of a plurality of market makers relating to securities traded on at least one common exchange where the market makers place bids and asks. The method can include receiving a dynamically updated data stream containing level 1 and level 2 data relating to a plurality of securities traded over the at least one exchange, the level 1 data including at least the last trade price, inside bid and inside ask of each security and the level 2 data containing a bid price, a bid time, a bid volume, a security identifier, and a market maker identifier for each bid, and an ask price, an ask volume, an ask time, a security identifier and a market maker identifier for each ask; and analyzing the data stream for a set of symbols to derive a statistic indicative of activity of an inside market for each of the symbols, the statistic updated to correspond to content of the updated data stream and the statistic selected from at least one of a total number of market makers at the inside market, and a difference between a number of market makers at an inside bid price and a number of market makers at an inside ask price.

According to another aspect of the invention, the invention is directed to a method of tracking activity of a plurality of market makers relating to securities traded on at least one common exchange where the market makers place bids and asks. The method can include receiving a dynamically updated data stream containing level 1 and level 2 data relating to a plurality of securities traded over the at least one exchange, the level 1 data including at least the last trade price, inside bid and inside ask of each security and the level 2 data containing a bid price, a bid time, a bid volume, a security identifier, and a market maker identifier for each bid, and an ask price, an ask volume, an ask time, a security identifier and a market maker identifier for each ask; and analyzing the data stream for a set of symbols to derive a statistic indicative of volume activity of an inside market for each of the symbols, the statistic updated to correspond to content of the updated data stream and the statistic selected from at least one of a total volume of shares at the inside market, a difference between a number of shares at an inside bid price and a number of shares at an inside ask price, percent of inside market shares at the inside bid price, and percent of inside market shares at the inside ask price.

According to yet another aspect of the invention, the invention is directed to a method of tracking a plurality of symbols relating to securities traded on at least one common exchange. The method can include receiving a dynamically updated data stream containing level 1 data relating to the plurality of symbols traded over the at least one exchange, the level 1 data including at least the last trade price of each symbol; and analyzing the data stream for a set of symbols to derive for each symbol at least one of: an upward price movement indicator by dividing a count of the number of times the symbol achieves a new intra-session high by an intra-session trading price range, and a downward price movement indicator by dividing a count of the number of times the symbol achieves a new intra-session low by the intra-session price range.

According to still another aspect of the invention, the invention is directed to a method of tracking a plurality of symbols relating to securities traded on at least one common exchange. The method can include receiving a dynamically updated data stream containing level 1 data relating to the plurality of symbols traded over the at least one exchange, the level 1 data including at least the last trade price of each symbol; and analyzing the data stream for a set of symbols to derive for each symbol at least one of: a high opening balance range extension by subtracting a high trade price established during an opening balance delay interval from a current high trade price, and a low opening balance range extension by subtracting a current low trade price from a low trade price established during the opening balance delay interval.

According to yet another aspect of the invention, the invention is directed to a method of tracking a plurality of symbols relating to securities traded on at least one common exchange. The method can include receiving a dynamically updated data stream containing level 1 data relating to the plurality of symbols traded over the at least one exchange, the level 1 data including at least the last trade price of each symbol; and tracking on a symbol by symbol basis for a set of symbols a statistic selected from at least one of: a difference between a number of trades for a first time period and a number of trades for a second time period, a difference between a total volume of shares traded for the first time period and a total volume of shares traded for the second time period, an average volume of shares per trade for the first time period, an average volume of shares per trade for the second time period and a difference between the average volume of shares per trade for the first time period and the average volume of shares per trade for the second time period.

According to another aspect of the invention, the invention is directed to a method of tracking a plurality of symbols and activity of a plurality of market makers relating to securities traded on at least one common exchange where the market makers place bids and asks. The method can include receiving a dynamically updated data stream containing level 2 data relating to a plurality of securities traded over the at least one exchange, the level 2 data containing a bid price, a bid time, a bid volume, a security identifier, and a market maker identifier for each bid, and an ask price, an ask volume, an ask time, a security identifier and a market maker identifier for each ask; and tracking on a symbol by symbol basis for a set of symbols at least one statistic selected from a number of bids, a number of asks, a bid volume of shares, an ask volume of shares, a volume of shares per bid and a volume of shares per ask for each of a first time period and a second time period.

According to yet another aspect of the invention, the invention is directed to a method of tracking a plurality of symbols and activity of a plurality of market makers relating to securities traded on at least one common exchange where the market makers place bids and asks. The method can include receiving a dynamically updated data stream containing level 2 data relating to a plurality of securities traded over the at least one exchange, the level 2 data containing a bid price, a bid time, a bid volume, a security identifier, and a market maker identifier for each bid, and an ask price, an ask volume, an ask time, a security identifier and a market maker identifier for each ask; and for a selected market maker, tracking on a symbol by symbol basis for a set of symbols at least one statistic selected from a number of bids, a number of asks, a bid volume of shares, an ask volume of shares, a volume of shares per bid and a volume of shares per ask for each of a first time period and a second time period.

According to another aspect of the invention, the invention is directed to a method of tracking activity of a plurality of market makers relating to securities traded on at least one common exchange where the market makers place bids and asks. The method can include receiving a dynamically updated data stream containing level 1 and level 2 data relating to a plurality of securities traded over the at least one exchange, the level 1 data including at least the last trade price, inside bid and inside ask of each security and the level 2 data containing a bid price, a bid time, a bid volume, a security identifier, and a market maker identifier for each bid, and an ask price, an ask volume, an ask time, a security identifier and a market maker identifier for each ask; and for each symbol and market maker pair from a set of symbols and a set of market makers, counting at least one of a number of times that a bid having an inside bid price is placed, and a number of times that an ask having an inside ask price is placed.

According to still another aspect of the invention, the invention is directed to a method of tracking activity of a plurality of market makers relating to securities traded on at least one common exchange where the market makers place bids and asks. The method can include receiving a dynamically updated data stream containing level 1 and level 2 data relating to a plurality of securities traded over the at least one exchange, the level 1 data including at least the last trade price, inside bid and inside ask of each security and the level 2 data containing a bid price, a bid time, a bid volume, a security identifier, and a market maker identifier for each bid, and an ask price, an ask volume, an ask time, a security identifier and a market maker identifier for each ask; and for each symbol and market maker pair from a set of symbols and a set of market makers, counting at least one of a number of times the market maker is a first market maker to post an inside bid that is higher than an immediately preceding inside bid for the symbol, and a number of times the market maker is a first market maker to post an inside ask that is lower than an immediately preceding inside ask for the symbol.

According to another aspect of the invention, the invention is directed to a method of tracking activity of a plurality of market makers relating to securities traded on at least one common exchange where the market makers place bids and asks. The method can include receiving a dynamically updated data stream containing level 1 and level 2 data relating to a plurality of securities traded over the at least one exchange, the level 1 data including at least the last trade price of each security and the level 2 data containing a bid price, a bid time, a bid volume, a security identifier, and a market maker identifier for each bid, and an ask price, an ask volume, an ask time, a security identifier and a market maker identifier for each ask; and for each symbol and market maker pair from a set of symbols and a set of market makers, generating at least one of a bid persistence statistic by approximating a percentage of a predetermined number trades for which the market maker had an inside bid price, and an ask persistence statistic by approximating a percentage of a predetermined number of trades for which the market maker has an inside ask price.

According to another aspect of the invention, the invention is directed to a program embodied in computer readable medium to track activity of a plurality of market makers relating to securities traded on at least one common exchange where the market makers place bids and asks. The program can include code that receives a dynamically updated data stream containing level 1 and level 2 data relating to a plurality of securities traded over the at least one exchange, the level 1 data including at least the last trade price, inside bid and inside ask of each security and the level 2 data containing a bid price, a bid time, a bid volume, a security identifier, and a market maker identifier for each bid, and an ask price, an ask volume, an ask time, a security identifier and a market maker identifier for each ask; and code that analyzes the data stream for a set of symbols to derive a statistic indicative of activity of an inside market for each of the symbols and update the statistic to correspond to content of the updated data stream, the statistic selected from at least one of a total number of market makers at the inside market, and a difference between a number of market makers at an inside bid price and a number of market makers at an inside ask price.

According to another aspect of the invention, the invention is directed to a program embodied in computer readable medium to track activity of a plurality of market makers relating to securities traded on at least one common exchange where the market makers place bids and asks. The program can include code that receives a dynamically updated data stream containing level 1 and level 2 data relating to a plurality of securities traded over the at least one exchange, the level 1 data including at least the last trade price, inside bid and inside ask of each security and the level 2 data containing a bid price, a bid time, a bid volume, a security identifier, and a market maker identifier for each bid, and an ask price, an ask volume, an ask time, a security identifier and a market maker identifier for each ask; and code that analyzes the data stream for a set of symbols to derive a statistic indicative of volume activity of an inside market for each of the symbols and that updates statistic to correspond to content of the updated data stream, the statistic selected from at least one of a total volume of shares at the inside market, a difference between a number of shares at an inside bid price and a number of shares at an inside ask price, percent of inside market shares at the inside bid price, and percent of inside market shares at the inside ask price.

According to another aspect of the invention, the invention is directed to a program embodied in computer readable medium to track a plurality of symbols relating to securities traded on at least one common exchange. The program can include code that receives a dynamically updated data stream containing level 1 data relating to the plurality of symbols traded over the at least one exchange, the level 1 data including at least the last trade price of each symbol; and code that analyzes the data stream for a set of symbols to derive for each symbol at least one of: an upward price movement indicator by dividing a count of the number of times the symbol achieves a new intra-session high by an intra-session trading price range, and a downward price movement indicator by dividing a count of the number of times the symbol achieves a new intra-session low by the intra-session price range.

According to another aspect of the invention, the invention is directed to a program embodied in computer readable medium to track a plurality of symbols relating to securities traded on at least one common exchange. The program can include code that receives a dynamically updated data stream containing level 1 data relating to the plurality of symbols traded over the at least one exchange, the level 1 data including at least the last trade price of each symbol; and code that analyzes the data stream for a set of symbols to derive for each symbol at least one of: a high opening balance range extension by subtracting a high trade price established during an opening balance delay interval from a current high trade price, and a low opening balance range extension by subtracting a current low trade price from a low trade price established during the opening balance delay interval.

According to another aspect of the invention, the invention is directed to a program embodied in computer readable medium to track a plurality of symbols relating to securities traded on at least one common exchange. The program can include code that receives a dynamically updated data stream containing level 1 data relating to the plurality of symbols traded over the at least one exchange, the level 1 data including at least the last trade price of each symbol; and code that tracks on a symbol by symbol basis for a set of symbols a statistic selected from at least one of: a difference between a number of trades for a first time period and a number of trades for a second time period, a difference between a total volume of shares traded for the first time period and a total volume of shares traded for the second time period, an average volume of shares per trade for the first time period, an average volume of shares per trade for the second time period, and a difference between the average volume of shares per trade for the first time period and the average volume of shares per trade for the second time period.

According to another aspect of the invention, the invention is directed to a program embodied in computer readable medium to track a plurality of symbols and activity of a plurality of market makers relating to securities traded on at least one common exchange where the market makers place bids and asks. The program can include code that receives a dynamically updated data stream containing level 2 data relating to a plurality of securities traded over the at least one exchange, the level 2 data containing a bid price, a bid time, a bid volume, a security identifier, and a market maker identifier for each bid, and an ask price, an ask volume, an ask time, a security identifier and a market maker identifier for each ask; and code that tracks on a symbol by symbol basis for a set of symbols at least one statistic selected from a number of bids, a number of asks, a bid volume of shares, an ask volume of shares, a volume of shares per bid and a volume of shares per ask for each of a first time period and a second time period.

According to another aspect of the invention, the invention is directed to a program embodied in computer readable medium to track a plurality of symbols and activity of a plurality of market makers relating to securities traded on at least one common exchange where the market makers place bids and asks. The program can include code that receives a dynamically updated data stream containing level 2 data relating to a plurality of securities traded over the at least one exchange, the level 2 data containing a bid price, a bid time, a bid volume, a security identifier, and a market maker identifier for each bid, and an ask price, an ask volume, an ask time, a security identifier and a market maker identifier for each ask; and code that tracks for a selected market maker on a symbol by symbol basis for a set of symbols at least one statistic selected from a number of bids, a number of asks, a bid volume of shares, an ask volume of shares, a volume of shares per bid and a volume of shares per ask for each of a first time period and a second time period.

According to another aspect of the invention, the invention is directed to a program embodied in computer readable medium to track activity of a plurality of market makers relating to securities traded on at least one common exchange where the market makers place bids and asks. The program can include code that receives a dynamically updated data stream containing level 1 and level 2 data relating to a plurality of securities traded over the at least one exchange, the level 1 data including at least the last trade price, inside bid and inside ask of each security and the level 2 data containing a bid price, a bid time, a bid volume, a security identifier, and a market maker identifier for each bid, and an ask price, an ask volume, an ask time, a security identifier and a market maker identifier for each ask; and code that, for each symbol and market maker pair from a set of symbols and a set of market makers, counts at least one of a number of times that a bid having an inside bid price is placed, and a number of times that an ask having an inside ask price is placed.

According to another aspect of the invention, the invention is directed to a program embodied in computer readable medium to track activity of a plurality of market makers relating to securities traded on at least one common exchange where the market makers place bids and asks. The program can include code that receives a dynamically updated data stream containing level 1 and level 2 data relating to a plurality of securities traded over the at least one exchange, the level 1 data including at least the last trade price, inside bid and inside ask of each security and the level 2 data containing a bid price, a bid time, a bid volume, a security identifier, and a market maker identifier for each bid, and an ask price, an ask volume, an ask time, a security identifier and a market maker identifier for each ask; and code that, for each symbol and market maker pair from a set of symbols and a set of market makers, counts at least one of a number of times the market maker is a first market maker to post an inside bid that is higher than an immediately preceding inside bid for the symbol, and a number of times the market maker is a first market maker to post an inside ask that is lower than an immediately preceding inside ask for the symbol.

According to another aspect of the invention, the invention is directed to a program embodied in computer readable medium to track activity of a plurality of market makers relating to securities traded on at least one common exchange where the market makers place bids and asks. The program can include code that receives a dynamically updated data stream containing level 1 and level 2 data relating to a plurality of securities traded over the at least one exchange, the level 1 data including at least the last trade price of each security and the level 2 data containing a bid price, a bid time, a bid volume, a security identifier, and a market maker identifier for each bid, and an ask price, an ask volume, an ask time, a security identifier and a market maker identifier for each ask; and code that, for each symbol and market maker pair from a set of symbols and a set of market makers, generates at least one of a bid persistence statistic by approximating a percentage of a predetermined number trades for which the market maker had an inside bid price, and an ask persistence statistic by approximating a percentage of a predetermined number of trades for which the market maker has an inside ask price.

BRIEF DESCRIPTION OF DRAWINGS

These and further features of the present invention will be apparent with reference to the following description and drawings, wherein.

DISCLOSURE OF INVENTION

A. Introduction

Figure 1:
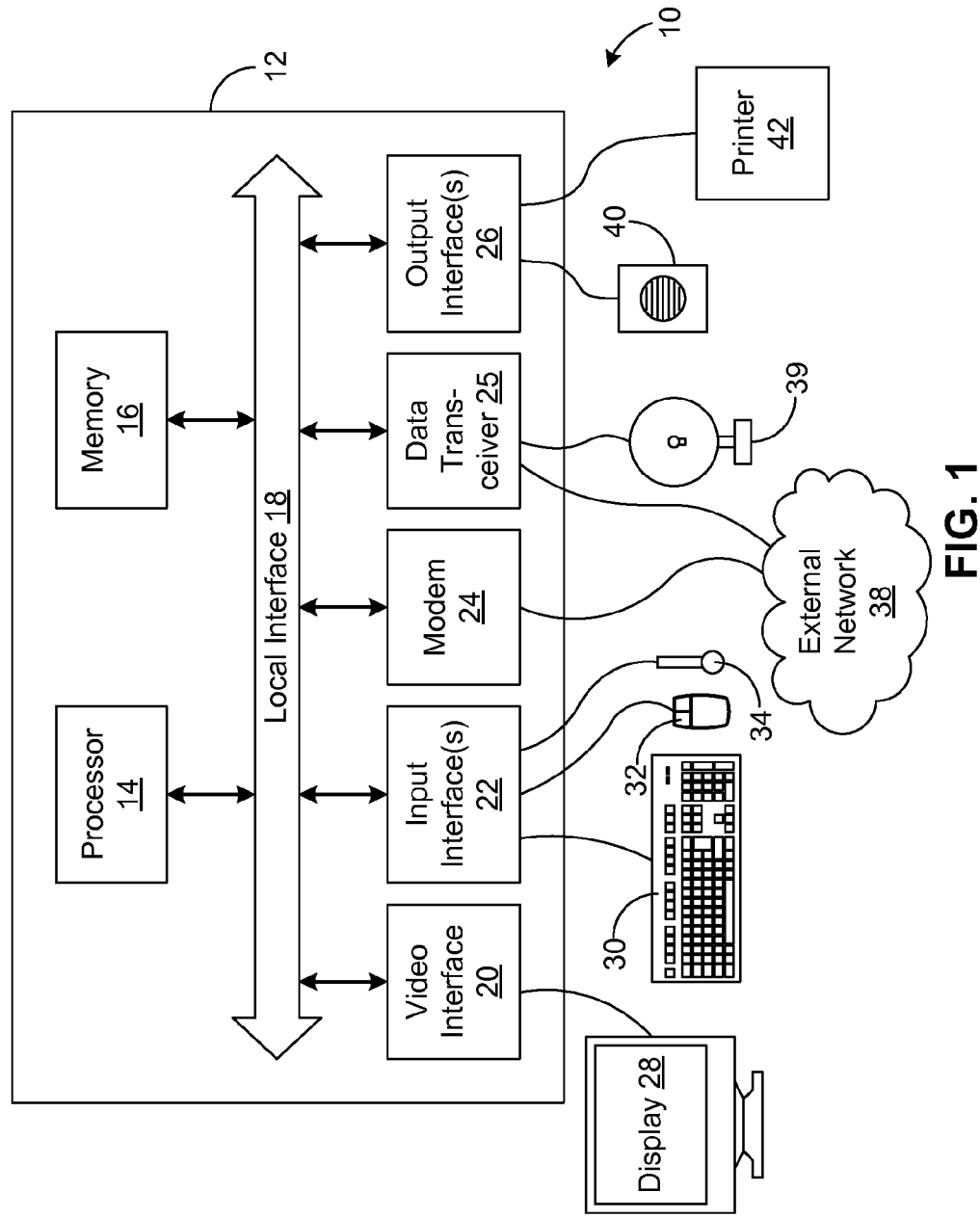
FIG. 1 is a block diagram of a securities and market maker activity tracking system according to the present invention.

In the detailed description which follows, identical components have been given the same reference numerals, regardless of whether they are shown in different embodiments of the present invention. To illustrate the present invention in a clear and concise manner, the drawings may not necessarily be to scale and certain features may be shown in somewhat schematic form.

The present invention relates to a system and associated methods of tracking securities traded over a common market. The system and associated methods assist a user to track and analyze the activity of market makers involved in the purchase and sale of the traded securities. In doing so, the system and associated methods observes market maker activity for trends, or indicators, potentially leading to short term (i.e., a limited duration of time) upward or downward price movement in at least one security. The system and methods use sets of dynamically updated items of information relating to market maker activity and statistics derived therefrom to present the user with information regarding the activity of marker makers involved in the purchase and sale of the traded securities.

The system utilizes level 1 and level 2 information to derive indicators of short term upward or downward price pressure for a plurality of securities selected by a user. The level 2 information can be filtered by a set of level 2 filters to derive a corresponding number of level 2 data sets. Indicators of upward or downward price pressure are derived from each of the level 2 data sets for each of a plurality of securities. The filters adapt themselves dynamically to current market conditions and will be described in greater detail below.

The information displayed to the user, including the calculated statistics, can be dynamically sorted so that with each screen refresh, the displayed information is ordered appropriately for the display method selected by the user.

The system can be placed in one or more operational modes, including a crowd montage mode, an expanded count mode, an action montage mode, and an insider's montage mode.

Briefly, in the crowd montage mode, the user can be presented with bid and ask information intended to highlight imbalances in terms of the number of market makers and/or bid and ask volume at the respective inside prices on a symbol by symbol basis.

In the expanded count mode, the user can be presented with information relating to new intra-trading session (sometimes referred to as intra-day) highs and/or new intra-trading session lows on a symbol by symbol basis.

In the action montage mode, the user can be presented with information to monitor changes in volumes both of trade activity and of market maker order activity. In the action montage mode, comparisons of average volume activity between different time periods can be made.

In the insider's montage mode, the user can be presented with information indicative of a market maker's degree of willingness to place orders at an inside price.

Other possible modes of operation are described in greater detail in co-owned U.S. patent application Ser. No. 10/167, 950, filed Jun. 12, 2002 (U.S. patent application publication number 2003/0069834, published Apr. 10, 2003), and in co-owned U.S. patent application Ser. No. 09/911,772, filed Jul. 24, 2001 (U.S. patent application publication number 2003/0065608, published Apr. 3, 2003), the disclosures of which are herein incorporated by reference in their entireties.

B. Securities and Market Maker Activity Tracking System Overview

B(i). Configuration

Referring to FIG. 1, a block diagram of a securities and market maker activity tracking system 10, or system 10, according to the present invention is illustrated. As used herein, the term "security" (or "securities") is intended to include, but is not limited to, shares of stocks in corporations (or options thereon), corporate or government bonds, commodity futures (or options thereon), currencies, options, indicies, mutual funds, and all other items traded over a common system or exchange. The term security can also include indices, such as for example, "the Dow", "the NASDAQ composite", a sector index or indicator and so forth. The term "symbol" (or "symbols") includes securities and indices. Briefly, the system 10 is a computer tool having a graphical user interface to assist a securities trader in analyzing information from security markets for opportune times to purchase or sell a particular security. Although the invention has application in tracking and analyzing securities of any type, the following discussion relates to the tracking and analysis of information related to the trading of shares of corporate stock on an exchange or exchanges.

More specifically, the activity of market makers (e.g., placement of bids and asks) is analyzed. Many of the modes of operation described herein are geared to seek out temporary, typically short term (e.g., lasting from several seconds to perhaps as long a several hours), imbalances in individual or collective market maker activity that could lead to a price change in a particular security or index. These imbalances are also referred to as upward or downward price pressures and may last for few seconds, minutes or hours depending on market conditions.

The system 10 includes a computer system 12, which can include multiple computers that can be located remotely from each other. However, in the illustrated embodiment of FIG. 1, the computer system 12 includes a single computer. The computer system 12 has one or more processors 14 for executing instructions, usually in the form of computer code, to carry out a specified logic routine. The computer system 12 has a memory 16 for storing data, software, logic routine instructions, computer programs, files, operating system instructions, and the like. The memory 16 can comprise several devices and includes, for example, volatile and non-volatile memory components. Volatile memory components typically do not retain data values upon a loss of power. Non-volatile memory components retain data upon a loss of power. Thus, the memory 16 can include, for example, random access memory (RAM), read only memory (ROM), hard disks, floppy disks, compact disks (including, but not limited to, CD-ROM, DVD-ROM, and CD-RW), tapes, and/or other memory components, plus associated drives and players for these memory types. In a multiple computer embodiment, the processor 14 can be multiple processors on one or more machines linked together locally or remotely. Software used to carry out the functions described herein can be broken-up so that different parts can be executed by different computers located locally or remotely from each other.

The processor 14 and the memory 16 are coupled to a local interface 18. The local interface 18 can be, for example, a data bus with an accompanying control bus, or a network between a processor and/or processors and/or memory or memories. The computer system 12 has a video interface 20, a number of input interfaces 22, a modem 24 and/or a data transceiver interface device 25 (the modem 24, the data transceiver 25 and any other device for receiving and/or transmitting data are also referred to herein as a receiver, a receiving means and/or a transceiver), a number of output interfaces 26, each being coupled to the local interface 18.

The system 10 has a display 28 coupled to the local interface 18 via the video interface 20. Although shown as a single cathode ray tube (CRT) type display, multiple displays can be used. Also, the display device can alternatively be, for example, a liquid crystal display (LCD), a plasma display, an electro-luminescent display, indicator lights, or light emitting diodes (LEDs). In addition, the system 10 has several input devices including, but not limited to, a keyboard 30, a mouse 32, a microphone 34, a digital camera (not shown) and a scanner (not shown), each being coupled to the local interface 18 via the input interfaces 22. The modem 24 and/or data transceiver 25 can be coupled to an external network 38 enabling the computer system 12 to send and receive data signals, voice signals, video signals and the like via the external network 38 as is well known in the art. The external network 38 may be, for example, the Internet, a wide area network (WAN), a local area network (LAN), a direct data link, or other similar network or communications link, including wireless networks. The modem 24 and/or the data transceiver 25 can be coupled to receive data from a satellite transceiver 39, co-axial cable, fiber optic cable, etc. It is noted that the system 10 can be accessed and used by a remote user via the external network 38 and modem 24. The system 10 can also include output devices coupled to the local interface 18 via the output interfaces 26, such as audio speakers 40, a printer 42, and the like.

The computer system 12 is programmed to display and execute a securities tracking software tool in graphical user interface (GUI) format. Other embodiments can include outputting data, such as in the form of spreadsheets for display using a spreadsheet software application, in the form of electronic mail, in the form of a page, and so forth. Alternatively, the computer system 12 has logic stored in the memory 16 capable of being executed to function as the securities tracking software tool.

Although described herein as being executed on a single computer system 12, functions can be distributed among multiple computing devices. In one embodiment of the invention, a server receives a level 1 and level 2 data stream and analyzes the data stream to produce statistics as described herein. The server outputs a data set, including the statistics, to a client terminal over a network or communications link. The client can further process the data sent and generate displays of data to a user.

Upon establishing a communications link with a data service provider, the securities tracking system 10 receives various items of information concerning securities traded at selected exchanges. The data service provider can be, for example, the exchange(s) itself and/or an entity that rebroadcasts data provided by or derived from one or more exchanges. For example, the user may elect to receive information for securities traded at the New York Stock Exchange (NYSE) and the National Association of Securities Dealers (NASDAQ). For the NASDAQ, there are about 8,000 securities, each being traded and having associated therewith items of level 1 information. This information is updated in real time or near real time (i.e., almost simultaneously with actual market activity) by the data service provider broadcasting signals to the securities tracking system 10. For example, each time a last trade value and volume for any security on the exchange changes, the data service provider will transmit the most recent traded value, trade volume, and trade time for the security to the securities tracking system 10.

Similarly, level 2 information can be provided from the data service provider to the securities tracking system 10. It is noted that at the time of filing the present application for Letters Patent, NYSE level 2 information is generally not available. However, the concepts and inventions described herein will have equal application to level 2 type information from any exchange, including the NYSE. As an example, level 2 information for the NASDAQ includes each market maker with an open bid or ask for any security listed on the exchange being tracked. The NASDAQ level 2 information includes the time that the ask or bid was placed (also referred to respectively as an ask time and a bid time), the size of the ask or bid in number of shares (often reported in lots of one hundred), and the value of the bid or ask, all of which is transmitted to the securities tracking system 10 in real time or near real time.

The total amount of transmitted level 2 information will depend on the number of market makers placing bids or asks for any given security at any given time. It has been estimated that between level 1 and level 2 information for NASDAQ, that there are about 400 to about 1,000 items of information that are updated each second. It is also estimated that most of the market activity relates to a small number of securities since certain securities are more widely traded than others. For example, it has been estimated that about 90% of the market activity relates to about 10% of the securities on the NYSE and the NASDAQ.

As one skilled in the art will appreciate, the foregoing architecture for the securities and market maker activity tracking software tool and associated operational logic is exemplary. Alternative systems for and methods of carrying out the functions described herein will be apparent to one of ordinary skill in the art and are intended to fall within the scope of the claims appended hereto. The logic described herein can be embodied in any computer-readable medium for use by or in connection with an instruction execution system such as a computer/processor-based system or other system that can fetch or obtain the logic from the computer-readable medium and execute the instructions contained therein. In the context of this document, a "computer-readable medium" can be any medium that can contain, store or maintain logic and/or data for use by or in connection with the instruction execution system. The computer-readable medium can be any one of many physical media such as, for example, electronic, magnetic, optical, electromagnetic, or semiconductor media. More specific examples of suitable computer-readable medium would include, but are not limited to, a portable magnetic computer diskette such as a floppy disk, a hard disk, a random access memory (RAM), a read-only memory (ROM), or a disk (e.g., a CD, a CD-RW, or a DVD-ROM).

B(ii). Watch Lists, Alerts and Modes of Operation

The user can set up various watch lists containing selected groups of securities of particular interest to the user, such as high tech companies, pharmaceutical companies, retailers, transportation providers, the NASDAQ 50 or 150, the user's favorite securities, and so forth. Within each watch list, securities are specified by ticker symbol.

The selected securities programmed into the watch lists by the user are stored within a database associated with the user. Statistics for each security in the user's database can be calculated regardless of whether the particular security is presently displayed. This allows the securities tracking system 10 to determine if a programmed alert (also referred to herein as an alarm) has been tripped for any of the securities in the user's database. If an alert is tripped, the alert can be displayed in an alert window.

The user can define more than one database to track various sets of securities. However, in a typical mode of operation, only one database is used at a time. As indicated above, each database can contain multiple watch lists to sub-divide the securities contained in a user's database. In addition, the same security can be included within more than one watch list contained within a database. The overall number of securities that can be contained in a database and processed by the securities tracking system 10 is limited only by the processing and memory capabilities of the computer system 12 being used to execute the securities tracking software tool.

Statistics that are derived from current market activity can be displayed in an analysis window on the display 28. It is noted that the statistics can be continually updated and resorted based on the incoming data stream and as described in greater detail herein. The statistics are calculated based on the incoming level 1 and/or level 2 data received over the communications link established with the level 1 and level 2 data service provider. In one embodiment, the displayed information presented on the display 28 is written to the screen according to a user controlled refresh rate. Refreshing the screen periodically, rather than continuously, reduces burdens on the computer system 12, thereby enhancing performance of the securities tracking system 10. Example refresh rates include four times a second, twice a second, once a second, every two seconds, and the like.

As indicated, the system can be programmed with alert thresholds that are tripped by data values contained within the level 1 or level 2 data stream or tripped by calculated statistics. The alerts are used to notify the user of market conditions that could influence the user's decision in purchasing or selling a particular security. If an alert is tripped, the user will be notified by the system. Alerts can be programmed by the user to be triggered on a global basis, on a per-security basis or on a per-market maker basis. More specifically, global alerts are those which are triggered for any security or market maker upon the presence of a certain condition. Alerts can take a number of forms, such as flashing icons on the display 28, audio alerts broadcast via the speaker 40 and the addition of the alert to an alert window (not shown). Alerts can also be embodied as electronic mail, pages, spreadsheets and so forth. It is noted that the securities tracking system 10 can produces alerts for all items in the user's database and not just the items displayed at any given time on the display 28. As one skilled in the art will appreciate, alerts can be programmed for any data value and can be based on a specific threshold value or deviation (expressed as a number or as a percentage) from a current or specified value. In addition, an alert can be based on multiple parameters.

Figure 4A:
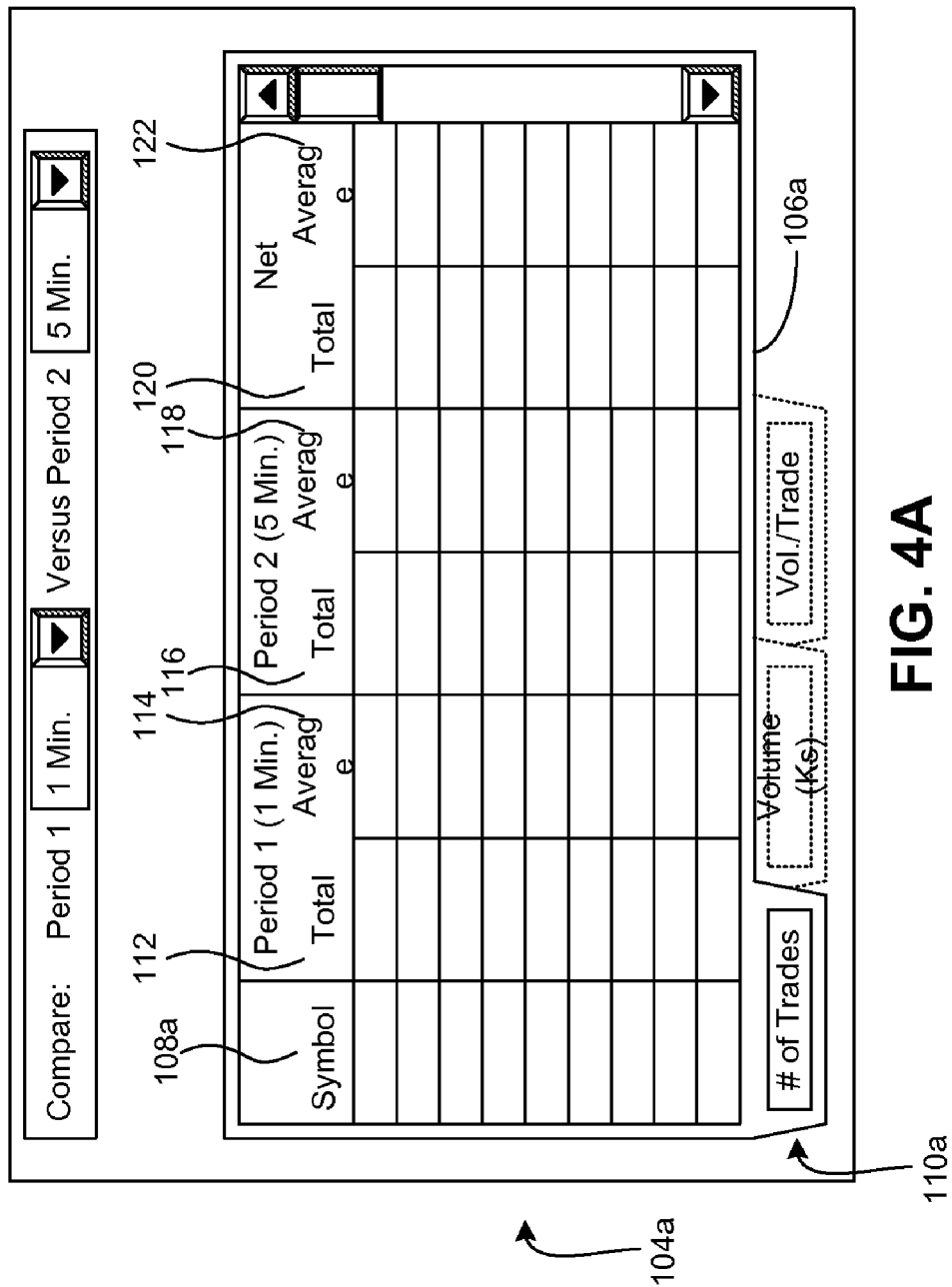
FIG. 4A is a block diagram of an analysis window in an action montage mode according to a trades view.
Figure 4B:
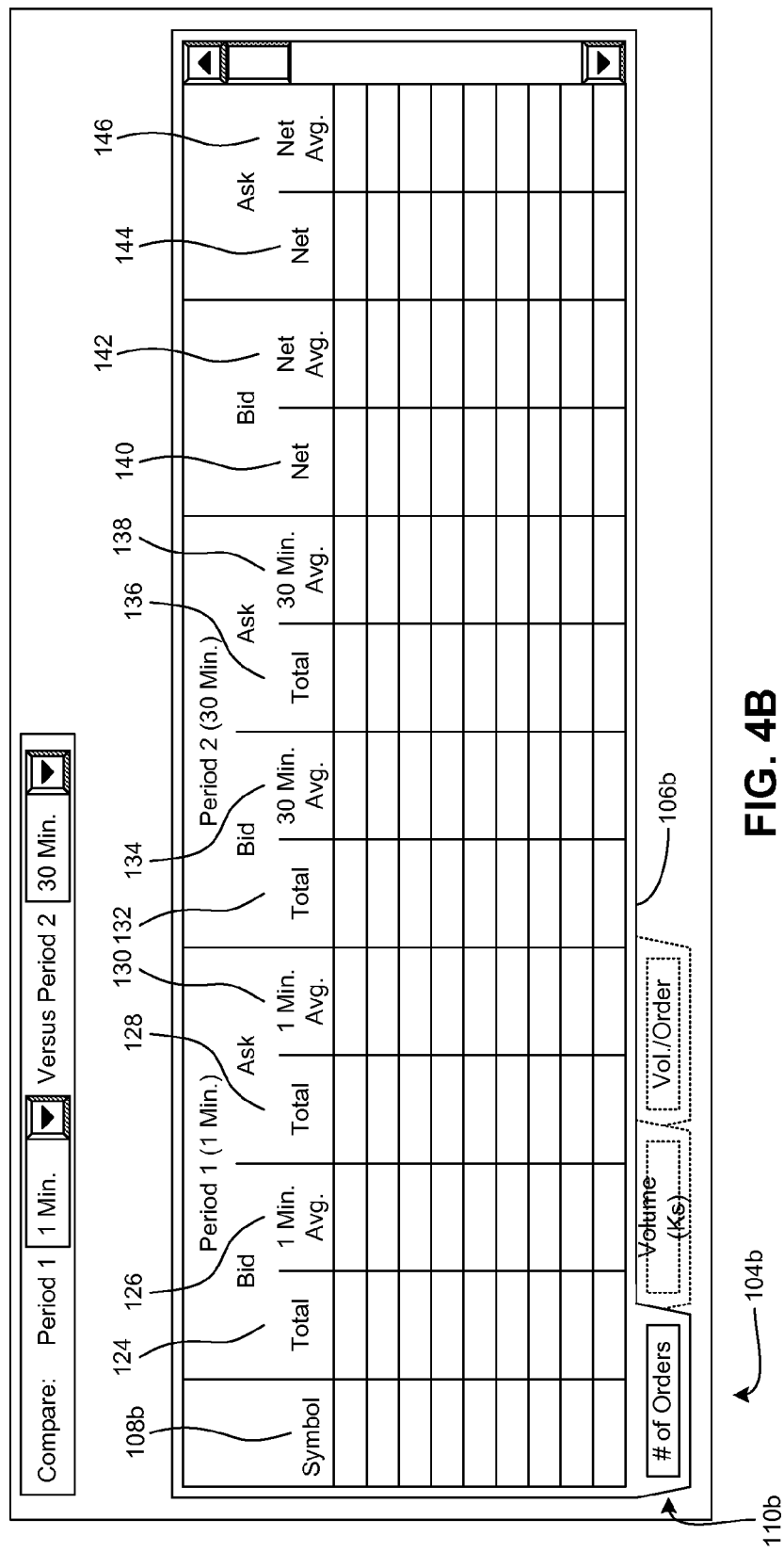
FIG. 4B is a block diagram of an analysis window in the action montage mode according to an orders view.
Figure 4C:
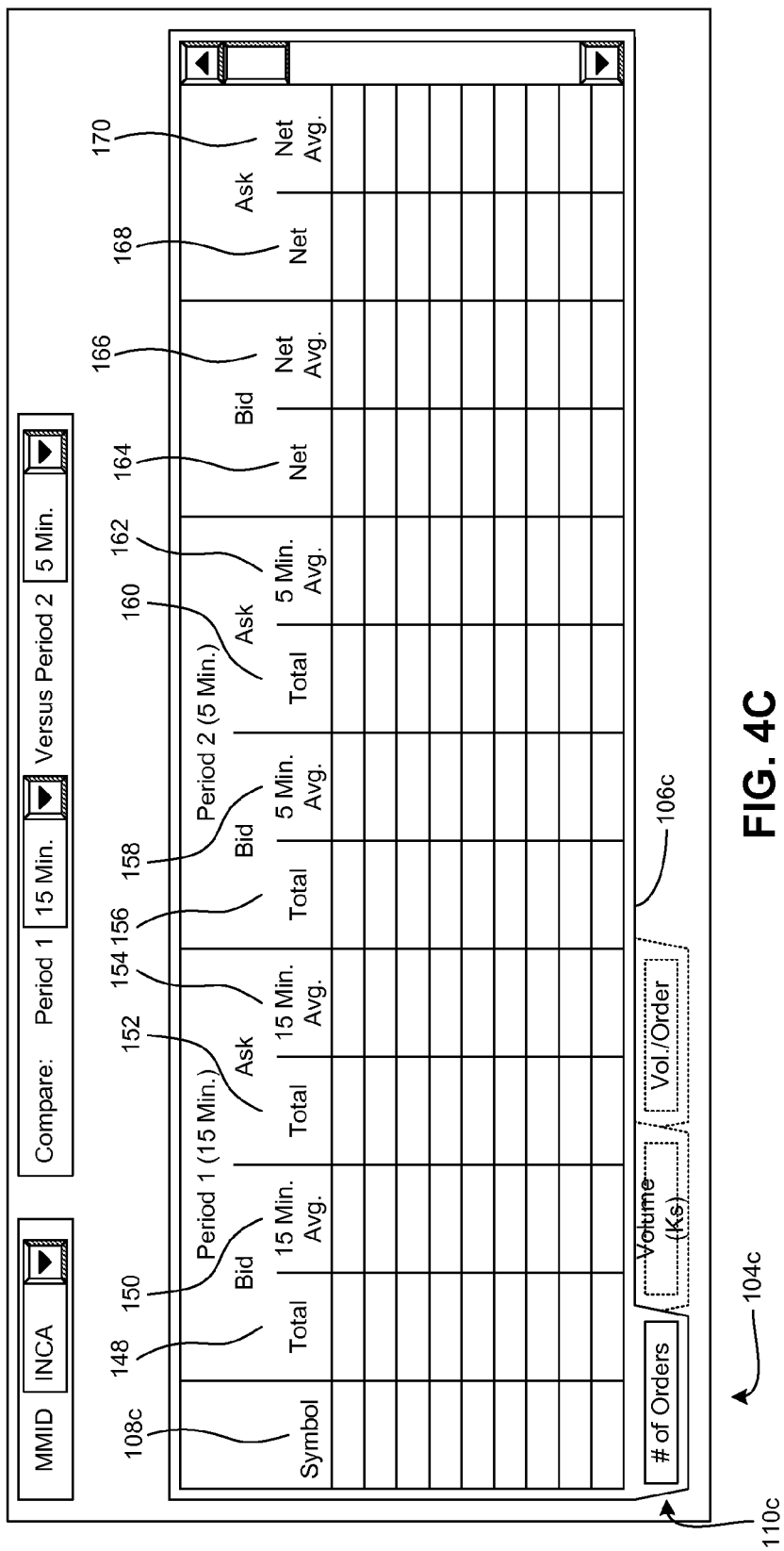
FIG. 4C is a block diagram of an analysis window in the action montage mode according to an order book view.
Figure 5:
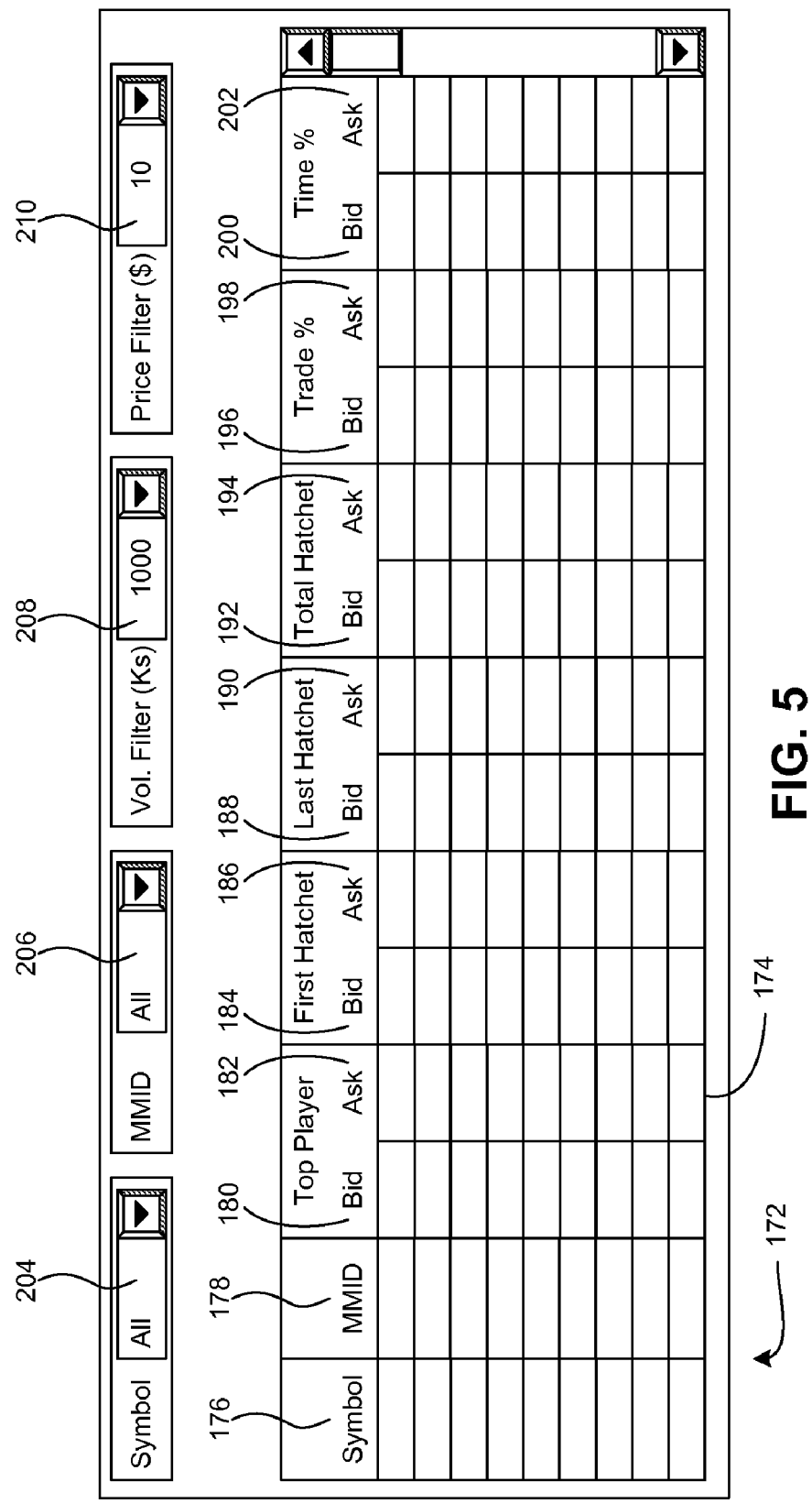
FIG. 5 is a block diagram of an analysis window in an insiders montage mode.

As will be described in more detail below, the system 10 can display information in one or more modes, including a crowd montage mode (FIG. 2), an expanded count mode (FIG. 3), an action montage mode (FIGS. 4A-4C), and an insider's montage mode (FIG. 5). Each mode has at least one associated analysis window format that can be displayed on the display 28 to provide the user with certain information relating to securities market and/or market maker activity. For each mode, one or more instances of an analysis window can be opened to display information for a different group of securities, group of market makers and/or filtration option. Also, analysis windows for multiple modes can be simultaneously opened. In the analysis windows, securities are identified by ticker symbol and market makers are identified by a four character marker maker identifier (MMID).

B(iii). Display Options and Dynamic Updating/Sorting

The user may visually configure any of the analysis windows discussed herein in a number of different ways. The analysis windows can be configured to include tables as shown in the illustrated examples. In other configurations, statistics and other information can be presented in graphical format, such as in the form of charts. When using tabular formatting, some of the illustrated columns need not be displayed. In other examples, the listed securities can be displayed in an order according to the values in one or more columns of information or in alphabetical order according to ticker symbol. For example, a trader may be interested in showing the securities in highest to lowest value order for a particular statistic. In another embodiment, selected columns can replace one another upon invoking a keyboard 30 or mouse 32 action. For example, a table can show certain columns and suppress display of other columns; but, upon invoking the keyboard 30 or mouse 32 action (e.g., right clicking on one of the particular columns), the selected column will be replaced by a suppressed column.

For simplicity of the drawing figures, the analysis windows of FIGS. 2-6 are shown in an unpopulated state. That is, the symbols, MMIDs, prices, volumes, statistics and so forth that would appear in an active analysis window have not been included. From the descriptions contained herein for the values listed under each heading of the analysis windows, one of ordinary skill in the art would be able to understand the manner in which the analysis windows would be populated if actively displaying information. Examples of populated windows analogous to the analysis windows described herein can be viewed in the U.S. patent applications identified above.

The information displayed in any particular analysis window can be dynamically updated as data relating to market maker activity is transmitted to the system 10. For example, at the time of refreshing the display 28, the tables shown in the analysis windows can be dynamically sorted such that the tables are re-ordered row by row to properly display the data in a manner selected by the user. For example, any column can be selected to display the entire table according to ascending or descending order for the values contained in the selected column, even if a different order of rows were displayed before the refresh. In this dynamic sorting scheme, each table can be sorted by selecting a particular column and when the table is refreshed to show information relating to current market activity, the table is re-ordered row by row to properly display the data in the manner selected by the user. The user can select to turn off this dynamic sorting feature of the present invention so that updated information will be displayed, but in the row by row order in which the rows were before the refresh.

The tables can be refreshed continually as new data is received and statistics are calculated. Alternatively, to conserve computer system 12 resources, the tables and chart(s) shown on the display 28 can be refreshed at periodic intervals such as every quarter second, every half second, every one second, every two seconds, every four seconds, or the like.

To assist the user to follow the activity of a selected symbol or a selected market maker, the securities tracking system 10 can be provided with a tracker feature. Since the analysis windows are updated at a relatively fast rate (e.g., continually or periodically) to reflect current market conditions, the rows corresponding to each security and/or market maker are subject to relatively rapid change in displayed position. It can become difficult and tiresome for a person to watch the activity of a particular market maker for a particular security in such an environment. The tracker feature visually highlights one or more rows of the analysis windows for a selected security(ies) and/or selected market maker(s) as the associated rows move upward or downward in the tables. The highlighting assists the user's eye in following the activity of the selected security(ies) and/or market maker(s) relative to the activity of the other securities and/or market makers. Additional discussion of the tracker feature can be found in the above-mentioned U.S. patent application Ser. No. 10/167, 950.

In addition to displaying updated statistics of current market activity, the securities tracking system 10 can store historical statistics relating to market activity for each stock in the user's database. More specifically, this information can be stored for subsequent charting or display in table format.

B(iv). Filtering

As indicated, the incoming data can be filtered using a level 2 filter, and displayed information can be based on a user selected filtration level (or threshold). Briefly, the level 2 filter is used by the securities tracking system 10 to disregard market maker activity that is more than a selected price percentage away from the last reported trade price of each security. This allows the user to confine analysis of market maker activity to those bids and asks that are close to the current market price of each security. Without being bound by theory, it is believed that by monitoring and analyzing market maker activity that is close to the current market price, only the most relevant items of information will be observed and be factored into any decision on purchasing or selling stock in a security. Example filtration thresholds, expressed as percentages, include 1%, 2%, 3%, 4%, and 5%. However, the filter percentage can be defined by the user and need not be an integer (e.g., 2.5%). Filters can also be based on a fixed distance (or distances) away from the last reported trade price, such as, for example, 5/16 of a point, 5/8 of a point, 3 cents, 1 cent, etc. In addition, the filter can be turned off so that no data relating to market activity is excluded. In one embodiment of the system 10, the incoming data stream is filtered at each possible filtration percentage (including preprogrammed percentages and user defined percentages) regardless of a filtration level selected by the user for displayed data. Corresponding data sets are derived for each of those filtration percentages. The data sets are stored for display as historical market maker activity or for immediate presentation if the user selects a different filtration level for displayed data.

The operation of the filter is dynamic to actively stay current with current market price. As an example of filter operation, if the last reported trade in a stock took place at $20.00 and the level 2 filter for displayed information was set to 1%, then all market maker bids below $19.80 (twenty cents being 1% of $20.00) and asks above $20.20 will be disregarded when displaying data, when calculating statistics or information to be displayed, and/or when generating and displaying alerts. Using the foregoing example, if the next reported ask for the stock is $20.10, the securities tracking system 10 will use the reported ask of $20.10 and then dynamically update the displayed statistics and determine if the updated statistics trigger any of the alerts set by the user. If, however, the next ask is $20.50, that ask will be disregarded as it is outside the range of data values allowed by the filter parameters. The filter adjusts itself dynamically based on the last trade value. For example, if, the next reported trade in stock moves to $19.90, all bids below $19.70 would be disregarded and all asks above $20.10 would be disregarded. The system 10 will filter the incoming data stream in the same manner for every other filter level to generate corresponding data sets. As indicated, the data sets are stored for display as historical market maker activity or for immediate presentation if the user selects a different filtration level for displayed data.

Other information can also be filtered from display and entry into the statistical calculations of the system 10. For example, a crossed market filter can be used to remove bids that are higher than the inside bid and asks that are lower than the inside ask. These bids and asks are usually old bids or asks that were not purged.

In addition to the level 2 filter and the crossed market filter, a bad data item filter (or bad tick filter) can be used to remove items of information which were erroneously entered by operators of the stock exchange databases and subsequently transmitted by the data service provider to the securities tracking system 10. The bad data filter can remove items of information which deviate significantly from surrounding price events for the same security. For example, a bid, ask or trade price deviating more than 10% from an average of the last ten similar events can be excluded. Another example of the bad data filter includes a filter which removes any items of price information (i.e., a bid quote, an ask quote or a trade price) which deviate from corresponding recent price information by about a multiple of 10 or 100. Such a data item indicates that a decimal point was erroneously typed in the price information or that a decimal place was omitted. For example, if a particular stock is trading at about $50.00 per share and a bid of $5.00 is received, the filter can remove that data item. Another bad data filter is a filter which removes items of price information which deviate by one integer in a price's dollar, tens or hundreds position. For example, if a security has been trading at about $23.00 a share, a data value of $22.00 a share or $24.00 a share can be disregarded.

C. Crowd Montage Mode

Figure 2:
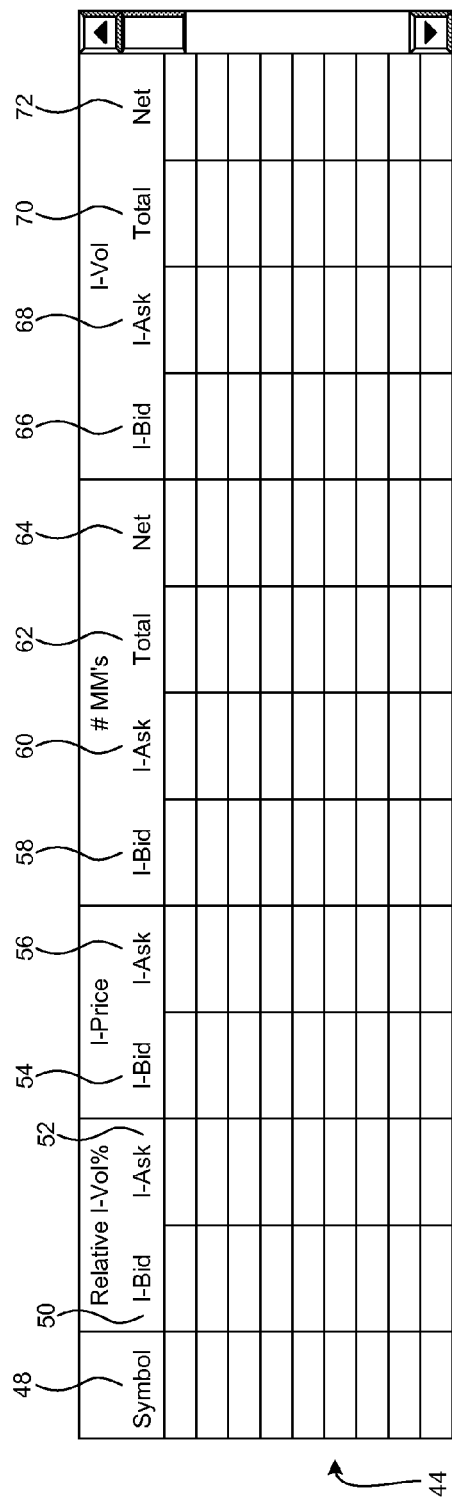
FIG. 2 is a block diagram of an analysis window in a crowd montage mode.

With additional reference to FIG. 2, an analysis window 44 is illustrated for the crowd montage mode. In this mode, the crowd montage analysis window 44 displays a table 46 identifying a group of securities for which "crowd" information is displayed. Selective information derived from the level 1 and level 2 information is displayed in association with each displayed ticker symbol (column 48), although the statistics discussed herein can be calculated for each security tracked by the securities tracking system 10 (this may include all securities in all of the user's watch lists or all securities on all exchanges from which data is received—even if the securities are of different type, such as a mix of stocks, futures and/or indices).

The displayed information can include relative inside volume percentage for bids and asks (respectively, columns 50 and 52), inside prices on the bid side and the ask side (respectively, columns 54 and 56), number of market makers at the inside bid and ask (respectively, column 58 and 60), total number of market makers at the inside bid and the inside ask (column 62), the difference between the number of market makers at the inside bid price and the inside ask price (column 64), volume of shares at the inside bid and inside ask (respectively, column 66 and 68), total volume number of shares at the inside bid and the inside ask (column 70), and the difference between the number of shares at the inside bid and the inside ask (column 74).

It is noted that the displayed statistics of the crowd montage mode window 44 can be derived from data after application of the user selected level 2 filter, and/or crossed market filter, refreshed on the display screen 28 at a desired refresh rate and dynamically sorted as discussed herein.

The foregoing columns of information presents the user with statistics relating to the inside bid(s) and the inside ask(s) that are intended to highlight imbalances in terms of the number of market makers and/or bid and ask volume at the respective inside prices on a symbol by symbol basis. Imbalances in terms of the number of market makers trying to buy or sell a security or imbalances in terms of the amount of shares of security available for sale or desired for purchase can be indicative of whether the price for a security will rise or fall. For example, if there is a large amount of activity (e.g., a "crowd" of market makers or a "crowd" of volume) on the bid side of a security, the price for the security is likely to rise. Similarly, if there is a large amount of activity (e.g., a "crowd" of market makers or a "crowd" of volume) on the ask side of a security, the price for the security is likely to decline.

Although the illustrated embodiment of the crowd montage mode displays information associated with market maker activity at the inside bid and the inside ask (the highest tier of level 2 data), the crowd montage mode can be adapted to display information at another tier of level 2 data (e.g., the second highest tier or the third highest tier. In another embodiment, the crowd montage mode can display information for multiple tiers of level 2 data as selected by the user.

In the crowd montage window 44, column 54 displays the inside bid price for each symbol shown in column 48. Similarly, column 56 displays the inside ask price for each symbol shown in column 48.

Column 58 respectively displays the total number of market makers having an active bid at the inside bid price for each symbol shown in column 48. Similarly, column 60 respectively displays the total number of market makers having an active ask at the inside ask price for each symbol shown in column 48. Column 62 shows the total number of market makers having an order at an inside price, which can be derived by adding corresponding values from column 58 and column 60. A relatively large number of total market makers for a particular security shows activity surrounding the security and could be an indication that the security may have or is undergoing a movement in price. Column 64 shows the difference between the number of market makers at the inside bid price and the number of market makers at the inside ask price, which can be derived by subtracting the value of column 60 from the corresponding value of column 58. In this embodiment, a positive value in column 64 would indicate that there are more market makers bidding for the corresponding security and a negative value in column 64 would indicate that there are more market makers offering the corresponding security. Relatively more market makers bidding on a security could be an indication that there is pressure towards buying that security (e.g., the security's price may rise) and relatively more market makers offering a security could be an indication that there is pressure towards selling that security (e.g., the security's price may decline).

Column 66 respectively displays the aggregate volume for all of the bids at the inside bid price for each symbol shown in column 48. Column 68 respectively displays the aggregate volume for all of the asks at the inside ask price for each symbol in column 48. Column 70 shows the total volume at the inside bid price and the inside ask price, which can be derived by adding corresponding values from column 66 and 68. Column 72 shows the difference between the volume at the inside bid price and the volume at the inside ask price, which can be derived by subtracting the value of column 68 from the corresponding value of column 66. In this embodiment, a positive value in column 72 would indicate that there is more interest in purchasing the corresponding security than in selling the corresponding security. A negative value in column 72 would indicate that there is more interest in selling the corresponding security that in purchasing the corresponding security. Relatively more inside bid volume for a security could be an indication that there is pressure towards buying that security (e.g., the security's price may rise) and relatively more inside ask volume for a security could be an indication that there is pressure towards selling that security (e.g., the security's price may decline).

The relative inside volumes shown in columns 50 and 52 are expressed as a percentage of total inside volume and are calculated respectively for each security identified in column 48. The relative inside bid volume values in column 50 can be calculated by dividing the corresponding inside bid volume (e.g., from column 66) by the total inside volume (e.g., from column 70). The relative inside ask volume values in column 52 can be calculated by dividing the corresponding inside ask volume (e.g., from column 68) by the total inside volume (e.g., from column 70). As should be appreciated, the sum of corresponding relative inside bid volume and relative inside ask volume values should total one hundred percent.

D. Expanded Count Mode

Figure 3:
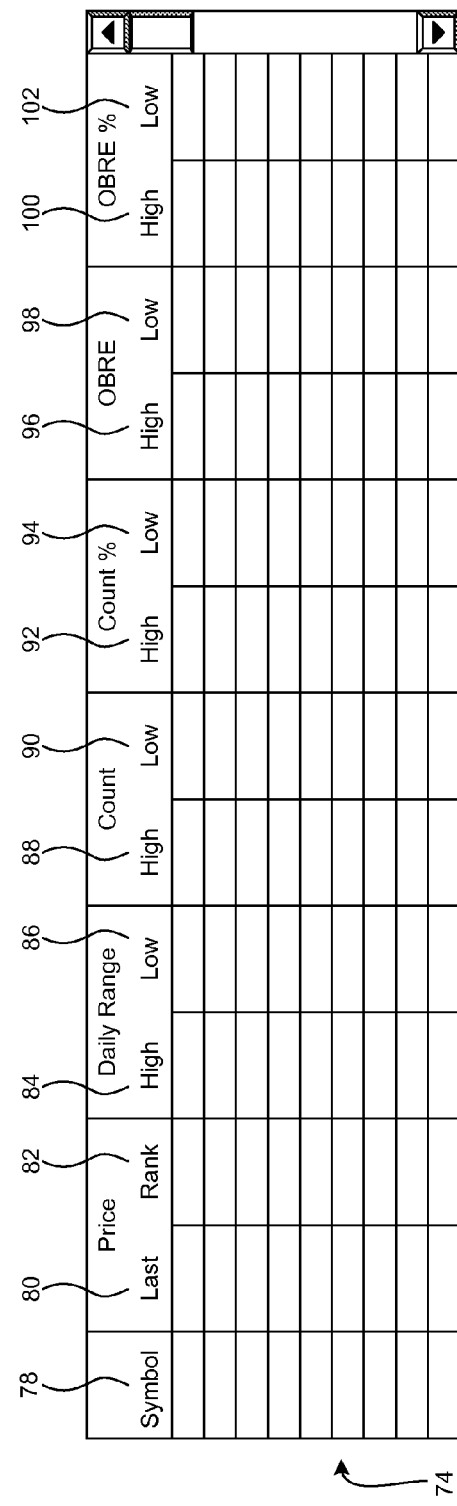
FIG. 3 is a block diagram of an analysis window in an expanded count mode.

Referring now to FIG. 3, an analysis window 74 is illustrated for the expanded count mode. In this mode, the expanded count analysis window 74 displays a table 76 identifying a group of securities for which "count" information is displayed. Selective information derived from the level 1 and level 2 information is displayed in association with each displayed ticker symbol (column 78), although the statistics discussed herein can be calculated for each security tracked by the securities tracking system 10 (this may include all securities in all of the user's watch lists or all securities on all exchanges from which data is received—even if the securities are of different type, such as a mix of stocks, futures and/or indices). Although not illustrated, a column can be added to identify the exchange in which individual securities are traded. As should be appreciated, such an exchange column can be added to any of the analysis windows described herein.

It is noted that the displayed statistics of the expanded count mode window 74 can be derived from data after application of a user selected volume filter and/or user selected price filter, refreshed on the display screen 28 at a desired refresh rate and dynamically sorted as discussed herein.

The expanded count mode analysis window 74 can include a last trade price column 80 and rank column 82. The rank value of column 82 presents the user with information regarding the relationship between a last trade price (e.g., as displayed in column 80) for each listed security and the intra-trading session high and low for the security. Generation of the rank values for column 82 is discussed in greater detail in the above-mentioned U.S. patent application Ser. No. 10/167,950, filed Jun. 12, 2002, and will not be discussed in great detail herein.

Briefly, in one embodiment, the rank value is a percentage value that is indicative of how far the last trade for the security is away from the session's high and low for the security. The difference between the session's high (which can be displayed in column 84) and the session's low (which can be displayed in column 86) is referred to herein as the "day's range." As new trading highs and/or lows are established for a security, the day's range will expand. Equation 1 can be used to calculate the rank value.

$$\text{Rank Value} = \frac{\text{Last Trade Value} - \text{Session Low}}{\text{Day's Range}} \qquad \text{Eq. 1}$$

The expanded count mode analysis window 74 can include a high count column 88 and a low count column 90. Generation of the count values for columns 88 and 90 is discussed in greater detail in the above-mentioned U.S. patent application Ser. No. 10/167,950, filed Jun. 12, 2002, and will not be discussed in great detail herein.

Briefly, the high count values displayed in column 88 represent the number of times during the trading session that the corresponding security traded at a new and higher intra-session high price. Similarly, the low count values displayed in column 90 represent the number of times during the trading session that the corresponding security traded at a new and lower intra-session low price.

In calculating the high and low counts, as well as the values for columns 92-102 discussed below, the securities tracking system 10 can be configured to ignore new highs and/or lows established during an initial period of trading for the trading session to allow the price for the security to settle near a trading range. The high count and the low count are based on level 1 trade price data.

Since major exchanges are auction markets, buyers and sellers compete with each other to buy and sell securities at desirable prices. At the beginning of a trading session (referred to as an "opening balance" period), trades for each security are made over a range of prices that establish a market value range (or "opening balance" price range) for the security. This opening balance price range is bounded by a high price and a low price, and contains all of the trades falling between the high price and the low price. Often, an entire session's trades for a security will fall within the opening balance price range. Occasionally, securities may experience a trending day, or a session when the security steadily advances in value or steadily declines in value. During such a session, the security will typically move in the same direction with some regularity and tend to close within five percent of the session's high (or low) trade value.

Certain traders would like to be able to identify when a security is having a trending day. Also, certain traders may be especially interested when a security trades outside the security's opening balance price range. These factors could assist the trader in deciding when to buy or sell a particular security.

The high count and the low count may serve as an indicator of trending, or that a particular security has a likelihood of advancing during the course of the trading session or declining during the course of the trading session. Securities having a relatively large high count value tend to be securities that have a likelihood of advancing during the course of the trading session. Securities having a relatively large low count value tend to be securities that have a likelihood of declining during the course of the trading session.

The count mode is intended to display to the user, on a real time or near real time basis, the number of new intra-session highs and/or new intra-session lows for each displayed security once an opening balance period has elapsed. Since each individual may have a different opinion as to how much time is needed for the market to establish a stable opening balance price range, the opening balance period during which new intra-session highs and new intra-session lows will be disregarded by the securities tracking system 10 can be defined by the user. The time period during which the securities tracking system 10 will disregard new intra-session highs and lows will be referred to herein as a count delay interval. Some common count delay intervals can include, for example, zero minutes (i.e., the high count and low count are calculated from the start of the trading session), fifteen minutes, thirty minutes, forty five minutes and sixty minutes.

Following the count delay interval, the securities tracking system 10 will, for each security monitored in the count mode, increment a high counter each time the security trades above the trading session's high for the security. Similarly, the securities tracking system 10 will, for each security monitored in the count mode and following the delay interval, increment a low counter each time the security trades below the trading session's low for the security. It is noted that the trading session's high and low are updated each time a new high and/or low is reached and each trade is compared against the current high and low to determine if the high counter or the low counter should be incremented.

As indicated, the securities for which the securities tracking system 10 maintains the high count and the low count can optionally be filtered. For example, the securities can be filtered based on volume. Liquidity of a security can be a concern to traders when deciding when to place a trade. Should there not be sufficient trading volume in a security, the trader cannot be assured that the trade (buy or sell) will proceed at or near the desired value. The securities tracking system can allow the user to filter out securities from the table 76 that do not exceed a certain liquidity threshold. For example, the volume filter can be based on the previous trading session's traded volume. In one embodiment, the securities tracking system 10 can be configured to track the high count and the low count for securities that had a total trade volume of greater than a certain number of shares (e.g., 500,000 shares) during the previous session (or trading day). The threshold can be established globally for all securities and/or on a security by security basis.

As one skilled in the art will appreciate, alternative volume filters can be employed. As another example, the high count and the low count can be maintained for all securities, but only those securities that reach a certain trade volume for the current trading session will be displayed in table 76. As another example, the high count and the low count can be maintained for only those securities that reach a certain trade volume after a predetermined time has elapsed. The predetermined time could be the same as the count delay interval or another time period.

Another filter that can be used (with or without the volume filter) is a price filter. Securities with a relatively low price (e.g., about $5.00 or less) can have a high transactional cost relative to the total cost of trading that security. Accordingly, the securities tracking system 10 can be configured to track the high count and the low count for securities having a trade value of over a specified threshold. The specified threshold can be user definable, apply to all securities globally and/or on a security by security basis, and/or can be set against various values (e.g., price at the close of the last session, current trade price, session's high, etc.).

Other filters, such as a user definable filter, can also be used alone or in conjunction with the foregoing filters, to reduce the securities tracked in the count mode to a desirable set of securities.

As indicated, the expanded count mode includes the derivation of statistics from the high and low count values. In turn, derivation of these statistics can commence after the opening balance period has elapsed and are based on data as filtered for generation of the high and low count values.

An upward price movement indicator, also referred to herein as a high count percentage value, for each displayed security can be displayed in column 92. The high count percentage can be calculated by dividing the high count (e.g., from column 88) by the day's range (e.g., the session's high from column 84 minus the session's low from column 86) and rounding to the nearest tenth. The high count percentage indicates the number of new highs per dollar of trading range for the session. A relatively high value for the high count percentage value can indicate aggressive upward price movement in the corresponding security.

A downward price movement indicator, also referred to herein as a low count percentage value, for each displayed security can be displayed in column 94. The low count percentage can be calculated by dividing the low count (e.g., from column 90) by the day's range (e.g., the session's high from column 84 minus the session's low from column 86) and rounding to the nearest tenth. The low count percentage indicates the number of new lows per dollar of trading range for the session. A relative high value for the low count percentage value can indicate aggressive downward price movement in the corresponding security.

A high opening balance range extension (OBRE) for each displayed security can be displayed in column 96. The high OBRE is the number of points, expressed in cents (or, alternatively, in dollars and cents), that the corresponding security has moved to establish the current high trade value from a high established during the opening balance delay interval. For example, if the current high in a security is $17.23 and the high that was established at some point during the opening balance delay interval was $16.01, then the high OBRE value for this security will be 122. As should be appreciated, the high OBRE is a measure of the range extension (price difference or distance), or "breakout," above the high established during the opening balance delay interval.

A low OBRE for each displayed security can be displayed in column 98. The low OBRE is the number of points, expressed in cents (or, alternatively, in dollars and cents), that the corresponding security has moved to establish the current low trade value from a low established during the opening balance delay interval. For example, if the current low in a security is $10.80 and the low that was established at some point during the opening balance delay interval was $11.00, then the low OBRE value for this security will be −20. As should be appreciated, the low OBRE is a measure of the range extension (price difference or distance), or "breakout," below the low established during the opening balance delay interval.

A high OBRE percentage value for each displayed security can be displayed in column 100. The high OBRE percentage can be calculated by dividing the high OBRE (e.g., from column 96) by the day's range (e.g., the session's high from column 84 minus the session's low from column 86). The high OBRE percentage can be expressed as a percentage value.

A low OBRE percentage value for each displayed security can be displayed in column 102. The low OBRE percentage can be calculated by dividing the low OBRE (e.g., from column 98) by the day's range (e.g., the session's high from column 84 minus the session's low from column 86). The low OBRE percentage can be expressed as a percentage value.

Although not illustrated additional columns can be added to the expanded count mode window 74, such as a volume column and a money flow column. The volume column can be used to show the number of shares traded thus far during the trading session for each displayed security. As is known in the art, the money flow column can show how much money is moving in or out of a particular stock. A positive money flow value for a security indicates that money is flowing into the security, whereas a negative money flow indicates that money is flowing out of the security. The money flow value starts at zero for each trading session and is the sum of all net money flows during the session. Only trades with prices different from the previous ones are used in calculating money flow. For example, if a security is traded at $50.00 and a new trade of 100 shares is made at $50.125, then an amount of 100 times $50.125 (or a net money flow of $5,012.50) is added to the current money flow value. If the price of the new trade is lower than the previous trade, the money flow value is decreased in a corresponding manner. If there is no change in price between sequential trades, then the net change is zero and the money flow value will not be changed.

E. Action Montage Mode

E(i). Action Montage Mode Overview

In the action montage mode, the user is presented with information that may be indicative of market driving activity. In the illustrated embodiment, the user is presented with information to monitor changes in volumes both of trade activity and of market maker order activity. In the action montage mode, comparisons of average volume activity between different time periods can be made. This information can be useful in deciding when to buy or sell a particular security since changes in activity are often connected with changes in price. For instance, a user may want to know when the average trade volume over the last five minutes for a particular security is twice as high as the average trade volume for the most recent thirty minutes. The action montage mode can show this type of comparison. In addition, alarms can be set to alert the user if a desired condition arises even if information relating to events that would trigger the alarm are not actively displayed.

The action montage mode has different views for displaying action related information, including a trades view, an orders view and an order book view. For each of the views in the action montage mode, selective information derived from the level 1 and level 2 information is displayed in association with each displayed ticker symbol, although the statistics discussed herein can be calculated for each security tracked by the securities tracking system 10 (this may include all securities in all of the user's watch lists or all securities on all exchanges from which data is received—even if the securities are of different type, such as a mix of stocks, futures and/or indices).

It is noted that the displayed statistics in the action montage mode can be derived from data after application of the user selected level 2 filter, and/or crossed market filter, refreshed on the display screen 28 at a desired refresh rate and dynamically sorted as discussed herein. In another embodiment, the statistics for the action montage mode are dynamically calculated as level 1 and level 2 information is received, but analysis windows associated with the action montage mode are updated once a minute.

Each of the views in the action montage can be used to display statistics for a first time period (illustrated as "period 1") versus a second time period (illustrated as "period 2"). The time periods can have any duration, but will typically range from about one minute to about sixty minutes. The length of the first and second time periods can be selected by user action such as typing in a selected length of time or selecting from a drop down menu containing predetermined time lengths, such as one minute, five minutes, ten minutes, fifteen minutes, thirty minutes and sixty minutes. The first time period can be selected to be shorter than, the same as or longer than the second time period.

E(ii). Action Montage Mode-Trades View

With reference to FIG. 4A, an analysis window 104a is illustrated for the action montage mode when placed in the trades view. In this mode and view, the action montage analysis window 104a displays a table 106a identifying a group of securities (column 108a) for which "trade action" information is displayed. Three different data sets can be displayed, which can be selected by user action such as "clicking on" a desired tab 110a. The illustrated data sets include statistics relating to number of trades that took place, the volume of shares that were traded, and volume as a function of trades (e.g., average share volume per trade calculated by dividing trade volume by the number of trades). For each of these data sets the basic database structure of the window 104a is same and, therefore, is illustrated only once. However, it should be appreciated that the cells of the table 106a will be populated with data corresponding to the selected tab 110a. In the illustrated example, the number of trades tab 110a has been selected.

In the illustrated example for the window 104a, the first time period has been set to one minute and the second time period has been set to five minutes; but, these time periods are changeable as set forth in greater detail above. The table 106a includes a period one total column 112, a period one average column 114, a period two total column 116, a period two average column 118, a net total column 120, and a net average column 122.

E(ii)(a). Action Montage Mode—Trades View—Trades Tab

When the number of trades tab 110a is selected, the period one total column 112 will display, for each corresponding security, the total number of trades taking place during the most recent length of time corresponding to the time length selected for period one (in the illustrated example, column 112 would display the number of trades taking place in the last minute). In the period one average column 114, the average number of trades per minute during the most recent length of time corresponding to the time length selected for period one would be displayed. For example, if the period one time length were ten minutes and 400 total trades were made, the average column 114 would show a value of 40. If the length of time for period one were selected to be one minute, the average (column 114) and the total (column 112) would be the same.

When the number of trades tab 110a is selected, the period two total column 116 will display, for each corresponding security, the total number of trades taking place during the most recent length of time corresponding to the time length selected for period two (in the illustrated example, column 116 would display the number of trades taking place in the last five minutes). In the period two average column 116, the average number of trades per minute during the most recent length of time corresponding to the time length selected for period two would be displayed.

When the number of trades tab 110a is selected, the net total column 120 shows a difference between the total trades of the first time period (e.g., column 112) and the total trades of the second time period (e.g., column 116). In one embodiment, the value for the net total column can be calculated by subtracting the corresponding value in column 112 from the corresponding value in column 116 (e.g., total for time period two minus total for time period one). The net average column 122 shows a net difference in the average from time period one (e.g., column 114) the average from time period two (e.g., column 118) and can be calculated by subtracting the corresponding value in column 114 from the corresponding value in column 118 (e.g., average for time period two minus average for time period one).

E(ii)(b). Action Montage Mode—Trades View—Volume Tab

When the volume tab 110a is selected, the period one total column 112 will display, for each corresponding security, the total volume of shares traded during the most recent length of time corresponding to the time length selected for period one (in the illustrated example, column 112 would display the volume traded in the last minute). In the period one average column 114, the average volume per minute during the most recent length of time corresponding to the time length selected for period one would be displayed. For example, if the period one time length were ten minutes and 40,000 total shares were traded, the average column 114 would show a value of 4,000. If the length of time for period one were selected to be one minute, the average and the total (column 112) would be the same.

When the volume tab 110a is selected, the period two total column 116 will display, for each corresponding security, the total volume of shares traded during the most recent length of time corresponding to the time length selected for period two (in the illustrated example, column 116 would display the volume traded in the last five minutes). In the period two average column 118, the average volume per minute during the most recent length of time corresponding to the time length selected for period two would be displayed.

When the volume tab 110a is selected, the net total column 120 shows a difference between the total shares traded for the first time period (e.g., column 112) and the total shares traded for the second time period (e.g., column 116). In one embodiment, the value for the net total column can be calculated by subtracting the corresponding value in column 112 from the corresponding value in column 116 (e.g., total for time period two minus total for time period one). The net average column 122 shows a net difference in the average from time period one (e.g., column 114) the average from time period two (e.g., column 118) and can be calculated by subtracting the corresponding value in column 114 from the corresponding value in column 118 (e.g., average for time period two minus average for time period one).

E(ii)(c). Action Montage Mode—Trades View—Volume per Trade Tab

When the volume per trade tab 110a is selected, the period one average column 114 will display, for each corresponding security, the average volume of shares per trade during the most recent length of time corresponding to the time length selected for period one (in the illustrated example, column 114 would display the average volume per trade in the last minute). It is noted that no statistics would be displayed in column 112 for this mode of operation and, optionally, column 112 can be omitted from the table 106a. For example, if the period one time length were ten minutes and an average of 500 shares per trade were made during the time period, the average column 114 would show a value of 500.

When the volume per trade tab 110a is selected, the period two average column 118 will display, for each corresponding security, the average volume of shares per trade during the most recent length of time corresponding to the time length selected for period two (in the illustrated example, column 118 would display the average volume per trade in the last five minutes). It is noted that no statistics would be displayed in column 116 for this mode of operation and, optionally, column 116 can be omitted from the table 106a.

When the volume per trade tab 110a is selected, the net average column 122 shows a net difference in the average from time period one (e.g., column 114) and the average from time period two (e.g., column 118) and can be calculated by subtracting the corresponding value in column 114 from the corresponding value in column 118 (e.g., average for time period two minus average for time period one). It is noted that no statistics would be displayed in column 120 for this mode of operation and, optionally, column 120 can be omitted from the table 106a.

E(iii). Action Montage Mode—Orders View

With reference to FIG. 4B, an analysis window 104b is illustrated for the action montage mode when placed in the orders view. In this mode and view, the action montage analysis window 104b displays a table 106b identifying a group of securities (column 108b) for which "orders action" information is displayed. Three different data sets can be displayed, which can be selected by user action such as "clicking on" a desired tab 110b. The illustrated data sets include statistics relating to number of orders that were place by market makers, the total volume of shares ordered, and volume as a function of orders (e.g., average share volume per order calculated by dividing order volume by the number of orders). For each of these data sets the basic database structure of the window 104b is same and, therefore, is illustrated only once. However, it should be appreciated that the cells of the table 106b will be populated with data corresponding to the selected tab 110b. In the illustrated example, the number of orders tab 110b has been selected.

In the illustrated example for the window 104b, the first time period has been set to one minute and the second time period has been set to thirty minutes; but, these time periods are changeable as set forth in greater detail above. The table 106b includes a period one bid total column 124, a period one bid average column 126, a period one ask total column 128, a period one ask average column 130, a period two bid total column 132, a period two bid average column 134, a period two ask total column 136, a period two ask average column 138, a bid net column 140, a bid net average column 142, an ask net column 144, and an ask net average column 146.

E(iii)(a). Action Montage Mode—Orders View—Orders Tab

When the number of orders tab 110b is selected, the period one bid total column 124 will display, for each corresponding security, the total number of bid orders placed during the most recent length of time corresponding to the time length selected for period one. In the period one bid average column 126, the average number of bid orders per minute during the most recent length of time corresponding to the time length selected for period one would be displayed. The period one ask total column 128 will display, for each corresponding security, the total number of ask orders placed during the most recent length of time corresponding to the time length selected for period one. In the period one ask average column 130, the average number of ask orders per minute during the most recent length of time corresponding to the time length selected for period one would be displayed.

When the number of orders tab 110b is selected, the period two bid total column 132 will display, for each corresponding security, the total number of bid orders placed during the most recent length of time corresponding to the time length selected for period two. In the period two bid average column 134, the average number of bid orders per minute during the most recent length of time corresponding to the time length selected for period two would be displayed. The period two ask total column 136 will display, for each corresponding security, the total number of ask orders placed during the most recent length of time corresponding to the time length selected for period two. In the period two ask average column 138, the average number of ask orders per minute during the most recent length of time corresponding to the time length selected for period two would be displayed.

When the number of orders tab 110b is selected, the bid net column 140 shows a difference between the total bid orders of the first time period (e.g., column 124) and the total bid orders of the second time period (e.g., column 132). In one embodiment, the value for the net bid column 140 can be calculated by subtracting the corresponding value in column 124 from the corresponding value in column 132. The bid net average column 142 shows a net difference in the bid average from time period one (e.g., column 126) and the bid average from time period two (e.g., column 134) and can be calculated by subtracting the corresponding value in column 126 from the corresponding value in column 134. The ask net column 144 shows a difference between the total ask orders of the first time period (e.g., column 128) and the total ask orders of the second time period (e.g., column 136). In one embodiment, the value for the net ask column 144 can be calculated by subtracting the corresponding value in column 128 from the corresponding value in column 136. The ask net average column 146 shows a net difference in the ask average from time period one (e.g., column 130) and the ask average from time period two (e.g., column 138) and can be calculated by subtracting the corresponding value in column 130 from the corresponding value in column 138.

E(iii)(b). Action Montage Mode—Orders View—Volume Tab

When the volume tab 110b is selected, the period one bid total column 124 will display, for each corresponding security, the total volume of shares for all bid orders placed during the most recent length of time corresponding to the time length selected for period one. In the period one bid average column 126, the average volume of all bid orders per minute during the most recent length of time corresponding to the time length selected for period one would be displayed. The period one ask total column 128 will display, for each corresponding security, the total volume of shares for all ask orders placed during the most recent length of time corresponding to the time length selected for period one. In the period one ask average column 130, the average volume of all ask orders per minute during the most recent length of time corresponding to the time length selected for period one would be displayed.

When the volume tab 110b is selected, the period two bid total column 132 will display, for each corresponding security, the total volume of shares for all bid orders placed during the most recent length of time corresponding to the time length selected for period two. In the period two bid average column 134, the average volume of all bid orders per minute during the most recent length of time corresponding to the time length selected for period two would be displayed. The period two ask total column 136 will display, for each corresponding security, the total volume of shares for all ask orders placed during the most recent length of time corresponding to the time length selected for period two. In the period two bid average column 138, the average volume of all ask orders per minute during the most recent length of time corresponding to the time length selected for period two would be displayed.

When the volume tab 110b is selected, the bid net column 140 shows a difference between the total volume of bid orders of the first time period (e.g., column 124) and the total volume of bid orders of the second time period (e.g., column 132) (e.g., calculated by subtracting the corresponding value in column 124 from the corresponding value in column 132). The bid net average column 142 shows a net difference in the bid volume average from time period one (e.g., column 126) and the bid volume average from time period two (e.g., column 134) and can be calculated by subtracting the corresponding value in column 126 from the corresponding value in column 134. The ask net column 144 shows a difference between the total volume of ask orders of the first time period (e.g., column 128) and the total volume of ask orders of the second time period (e.g., column 136) (e.g., calculated by subtracting the corresponding value in column 128 from the corresponding value in column 136). The ask net average column 146 shows a net difference in the ask volume average from time period one (e.g., column 130) and the ask volume average from time period two (e.g., column 138) and can be calculated by subtracting the corresponding value in column 130 from the corresponding value in column 138.

E(iii)(c). Action Montage Mode—Orders View—Volume per Order Tab

When the volume per order tab 110b is selected, the period one bid average column 126 will display, for each corresponding security, the average volume of shares per bid for all bids placed during the most recent length of time corresponding to the time length selected for period one (in the illustrated example, column 126 would display the average volume per bid order in the last minute). It is noted that no statistics would be displayed in column 124 for this mode of operation and, optionally, column 124 can be omitted from the table 106b. The period one ask average column 130 will display, for each corresponding security, the average volume of shares per ask for all asks placed during the most recent length of time corresponding to the time length selected for period one. It is noted that no statistics would be displayed in column 128 for this mode of operation and, optionally, column 128 can be omitted from the table 106b.

When the volume per order tab 110b is selected, the period two bid average column 134 will display, for each corresponding security, the average volume of shares per bid for all bids placed during the most recent length of time corresponding to the time length selected for period two (in the illustrated example, column 134 would display the average volume per bid order in the last thirty minutes). It is noted that no statistics would be displayed in column 132 for this mode of operation and, optionally, column 132 can be omitted from the table 106b. The period two ask average column 138 will display, for each corresponding security, the average volume of shares per ask for all asks placed during the most recent length of time corresponding to the time length selected for period two. It is noted that no statistics would be displayed in column 136 for this mode of operation and, optionally, column 136 can be omitted from the table 106b.

When the volume per order tab 110b is selected, the bid net average column 142 shows a net difference in the bid volume per bid average from time period one (e.g., column 126) and the bid volume per bid average from time period two (e.g., column 134) and can be calculated by subtracting the corresponding value in column 126 from the corresponding value in column 134. It is noted that no statistics would be displayed in column 140 for this mode of operation and, optionally, column 140 can be omitted from the table 106b. The ask net average column 146 shows a net difference in the ask volume per ask average from time period one (e.g., column 130) and the ask volume per ask average from time period two (e.g., column 138) and can be calculated by subtracting the corresponding value in column 130 from the corresponding value in column 138. It is noted that no statistics would be displayed in column 144 for this mode of operation and, optionally, column 144 can be omitted from the table 106b.

E(iv). Action Montage Mode—Order Book View

With reference to FIG. 4C, an analysis window 104c is illustrated for the action montage mode when placed in the order book view. In this mode and view, the action montage analysis window 104c displays a table 106c identifying a group of securities (column 108c) for which "order book action" information is displayed. Three different data sets can be displayed, which can be selected by user action such as "clicking on" a desired tab 110c.

The illustrated data sets are based on activity of a particular market maker. The market maker for which data is displayed can be selected from, for example, a market maker drop-down menu. The order book view differs from the orders view in that the orders view displayed data relating to the activity of all market makers. Also, in the order book view, data is only presented for those securities for which the selected market maker has an active order pending.

The illustrated data sets for the orders book view include statistics relating to number of orders that were placed by the selected market maker per security, the total volume of shares ordered per security, and volume as a function of orders (e.g., average share volume per order calculated by dividing order volume by the number of orders). For each of these data sets the basic database structure of the window 104c is same and, therefore, is illustrated only once. However, it should be appreciated that the cells of the table 106c will be populated with data corresponding to the selected tab 110c. In the illustrated example, the number of orders tab 110c has been selected.

In the illustrated example for the window 104c, the first time period has been set to fifteen minutes and the second time period has been set to five minutes; but, these time periods are changeable as set forth in greater detail above. The table 106c includes a period one bid total column 148, a period one bid average column 150, a period one ask total column 152, a period one ask average column 154, a period two bid total column 156, a period two bid average column 158, a period two ask total column 160, a period two ask average column 162, a bid net column 164, a bid net average column 166, an ask net column 168, and an ask net average column 170.

E(iv)(a). Action Montage Mode—Order Book View—Order Tab

When the number of orders tab 110c is selected, the period one bid total column 148 will display, for each corresponding security, the total number of bid orders placed by the selected market maker during the most recent length of time corresponding to the time length selected for period one. In the period one bid average column 150, the average number of bid orders placed by the selected market maker per minute during the most recent length of time corresponding to the time length selected for period one would be displayed. The period one ask total column 152 will display, for each corresponding security, the total number of ask orders placed by the selected market maker during the most recent length of time corresponding to the time length selected for period one. In the period one ask average column 154, the average number of ask orders placed by the selected market maker per minute during the most recent length of time corresponding to the time length selected for period one would be displayed.

When the number of orders tab 110c is selected, the period two bid total column 156 will display, for each corresponding security, the total number of bid orders placed by the selected market maker during the most recent length of time corresponding to the time length selected for period two. In the period two bid average column 158, the average number of bid orders placed by the selected market maker per minute during the most recent length of time corresponding to the time length selected for period two would be displayed. The period two ask total column 160 will display, for each corresponding security, the total number of ask orders placed by the selected market maker during the most recent length of time corresponding to the time length selected for period two. In the period two ask average column 162, the average number of ask orders placed by the selected market maker per minute during the most recent length of time corresponding to the time length selected for period two would be displayed.

When the number of orders tab 110c is selected, the bid net column 164 shows a difference between the total bid orders of the first time period (e.g., column 148) and the total bid orders of the second time period (e.g., column 156). In one embodiment, the value for the net bid column 164 can be calculated by subtracting the corresponding value in column 148 from the corresponding value in column 156 The bid net average column 166 shows a net difference in the bid average from time period one (e.g., column 150) and the bid average from time period two (e.g., column 158) and can be calculated by subtracting the corresponding value in column 150 from the corresponding value in column 158. The ask net column 168 shows a difference between the total ask orders of the first time period (e.g., column 152) and the total ask orders of the second time period (e.g., column 160). In one embodiment, the value for the net ask column 168 can be calculated by subtracting the corresponding value in column 152 from the corresponding value in column 160. The ask net average column 170 shows a net difference in the ask average from time period one (e.g., column 154) and the ask average from time period two (e.g., column 162) and can be calculated by subtracting the corresponding value in column 154 from the corresponding value in column 162.

E(iv)(b). Action Montage Mode—Order Book View—Volume Tab

When the volume tab 110c is selected, the period one bid total column 148 will display, for each corresponding security, the total volume of shares for all bid orders placed by the selected market maker during the most recent length of time corresponding to the time length selected for period one. In the period one bid average column 150, the average volume of all bid orders placed by the selected market maker per minute during the most recent length of time corresponding to the time length selected for period one would be displayed. The period one ask total column 152 will display, for each corresponding security, the total volume of shares for all ask orders placed by the selected market maker during the most recent length of time corresponding to the time length selected for period one. In the period one ask average column 154, the average volume of all ask orders placed by the selected market maker per minute during the most recent length of time corresponding to the time length selected for period one would be displayed.

When the volume tab 110c is selected, the period two bid total column 156 will display, for each corresponding security, the total volume of shares for all bid orders placed by the selected market maker during the most recent length of time corresponding to the time length selected for period two. In the period two bid average column 158, the average volume of all bid orders placed by the selected market maker per minute during the most recent length of time corresponding to the time length selected for period two would be displayed. The period two ask total column 160 will display, for each corresponding security, the total volume of shares for all ask orders placed by the selected market maker during the most recent length of time corresponding to the time length selected for period two. In the period two bid average column 162, the average volume of all ask orders placed by the selected market maker per minute during the most recent length of time corresponding to the time length selected for period two would be displayed.

When the volume tab 110c is selected, the bid net column 164 shows a difference between the total volume of bid orders of the first time period (e.g., column 148) and the total volume of bid orders of the second time period (e.g., column 156) (e.g., calculated by subtracting the corresponding value in column 148 from the corresponding value in column 156). The bid net average column 166 shows a net difference in the bid volume average from time period one (e.g., column 150) and the bid volume average from time period two (e.g., column 158) and can be calculated by subtracting the corresponding value in column 150 from the corresponding value in column 158. The ask net column 168 shows a difference between the total volume of ask orders of the first time period (e.g., column 152) and the total volume of ask orders of the second time period (e.g., column 160) (e.g., calculated by subtracting the corresponding value in column 152 from the corresponding value in column 160). The ask net average column 170 shows a net difference in the ask volume average from time period one (e.g., column 154) and the ask volume average from time period two (e.g., column 162) and can be calculated by subtracting the corresponding value in column 154 from the corresponding value in column 162.

E(iv)(c). Action Montage Mode—Order Book View—Volume per Order Tab

When the volume per order tab 110c is selected, the period one bid average column 150 will display, for each corresponding security, the average volume of shares ordered for all bids placed by the selected market maker during the most recent length of time corresponding to the time length selected for period one (in the illustrated example, column 150 would display the average volume per bid order in the last fifteen minutes). It is noted that no statistics would be displayed in column 148 for this mode of operation and, optionally, column 148 can be omitted from the table 106c. The period one ask average column 154 will display, for each corresponding security, the average volume of shares per order for all asks placed by the selected market maker during the most recent length of time corresponding to the time length selected for period one. It is noted that no statistics would be displayed in column 152 for this mode of operation and, optionally, column 152 can be omitted from the table 106c.

When the volume per order tab 110c is selected, the period two bid average column 158 will display, for each corresponding security, the average volume of shares ordered for all bids placed by the selected market maker during the most recent length of time corresponding to the time length selected for period two (in the illustrated example, column 158 would display the average volume per bid order in the last five minutes). It is noted that no statistics would be displayed in column 156 for this mode of operation and, optionally, column 156 can be omitted from the table 106c. The period two ask average column 162 will display, for each corresponding security, the average volume of shares per order for all asks placed by the selected market maker during the most recent length of time corresponding to the time length selected for period two. It is noted that no statistics would be displayed in column 160 for this mode of operation and, optionally, column 160 can be omitted from the table 106c.

When the volume per order tab 110c is selected, the bid net average column 166 shows a net difference in the bid volume per order average from time period one (e.g., column 150) and the bid volume per order average from time period two (e.g., column 158) and can be calculated by subtracting the corresponding value in column 150 from the corresponding value in column 158. It is noted that no statistics would be displayed in column 164 for this mode of operation and, optionally, column 164 can be omitted from the table 106c. The ask net average column 170 shows a net difference in the ask volume per order average from time period one (e.g., column 154) and the ask volume per order average from time period two (e.g., column 162) and can be calculated by subtracting the corresponding value in column 154 from the corresponding value in column 162. It is noted that no statistics would be displayed in column 168 for this mode of operation and, optionally, column 168 can be omitted from the table 106c.

E(v). Additional and Alternative Embodiments for the Action Montage Mode

As should be appreciated, additional and alternative embodiments for the action montage mode exists. For example, a user can open two or more instantiations for the order book mode to observe whether different market makers are behaving in a similar or different manner with respect to one or more securities.

As indicated above, in one embodiment, the displayed windows 104 of the action montage mode can be updated about once per minute. In another embodiment, the updates can be made at a different interval, such as about once a second. Also, some or all of the statistics can be presented as a moving average (e.g., a simple moving average or an exponential moving average).

The user can also be given the option of comparing a certain time span of the present trading session with the "action" from the same relative time period of a previous trading session (e.g., the prior trading session) or an average from multiple previous trading sessions (e.g., the average for the same relative time period for each of prior five trading sessions). In this embodiment, the columns associated with the second time period (period two) could be used to display the statistics from the prior session(s) and the columns associated with comparing period one and period two could be used to display comparisons from the present trading session and the previous trading session(s). As an example, a user may be interested in observing the action montage mode statistics for the last half hour of the trading session relative to the same period from the past thirty days computed on an average daily basis.

Another feature that can be added is an identification of the bidding market maker and/or the asking market maker (including traditional market makers, electronic change networks and regional exchanges) associated with specific trades. As a variation, an entire window can be added to show statistics relating to actual trades made by a specific market maker, which could be displayed in similar format to the order book action montage window 104c.

Another feature can be a direct comparison of one market maker's activity to another specific market maker's activity (e.g., the illustrated period one columns replaced with a first market maker's activity for a certain time period and the illustrated period two columns replaced with a second market maker's activity for the same time period). Alternatively, a direct comparison of one (or more) market maker's activity to multiple market makers' activity can be made (e.g., the illustrated period one columns can be replaced with a first market maker's activity for a certain time period and the illustrated period two columns can be replaced with multiple market makers' activity, such as all other market makers' activity combined or a user defined group of market makers).

The system 10 can filter the displayed information such that symbols having traded volume below a specified volume threshold and/or a trade price below a specified price threshold can be excluded from display in the action montage mode windows 104. Another filter can be used to exclude bids and/or asks from the calculations of the statistics displayed in the order view and/or the order/book view that are one or more tiers away from the inside bid/ask.

F. Insiders Montage Mode

The insiders montage mode is based on the premise that market makers who are attempting to buy or sell a large volume of shares in a security will attempt to obfuscate this activity. The reason is that market makers are obligated to attempt to buy at the lowest possible price and sell at the highest possible price. If a market maker shows great interest in buying a security (e.g., by placing large volume orders), the price will likely increase for that security. Similarly, if a market maker shows a great interest in selling a security, the price will likely decline for that security. One common technique to hide a market maker's true activity is to attempt to place a large number of trades where each of those trades has a relatively small volume.

In the insiders montage mode, the user is presented with information indicative of persistent attempts by a market maker to buy and/or sell a particular security, thereby providing the user with insight as to the current major market participants for a given security. Some of the statistics for the insiders montage mode are based on time and others are based on market activity. With additional reference to FIG. 5, an analysis window 172 is illustrated for the insiders montage mode. In this mode, the insiders montage analysis window 172 displays a table 174 identifying a list of symbols in column 176. Each market maker having activity relating to a security of column 176 is identified in column 178. Accordingly, any particular security may be listed multiple times in column 176 for each market maker having orders for that security as listed in column 178.

Selective information derived from the level 1 and level 2 information is displayed in association with each displayed pair of ticker symbol (column 176) and market maker identifier (column 178). Although the statistics discussed herein can be calculated for each security tracked by the securities tracking system 10 (this may include all securities in all of the user's watch lists or all securities on all exchanges from which data is received—even if the securities are of different type, such as a mix of stocks, futures and/or indices).

The displayed information, for each security/market maker pair, can include a top player statistic for bids and asks (respectively, columns 180 and 182), a first hatchet statistic for bids and asks (respectively, columns 184 and 186), a last hatchet statistic for bids and asks (respectively, columns 188 and 190), a total hatchet statistic for bids and asks (respectively, columns 192 and 194), a trade percentage statistic for bids and asks (respectively, columns 196 and 198) and a time percentage statistic for bids and asks (respectively, columns 200 and 202).

It is noted that the displayed statistics of the insiders montage mode window 172 can be derived from data after application of the user selected level 2 filter, and/or crossed market filter, refreshed on the display screen 28 at a desired refresh rate and dynamically sorted as discussed herein.

Other filters for the display of data in the insiders montage mode window 172 can be applied. For example, only certain securities (e.g., as selected using a drop down menu 204) can be presented in the table 174. The selected securities can include all securities, one security or a user selected combination of securities. As another example, only certain market makers or types of market makers (e.g., as selected using a drop down menu 206) can be presented in the table 174. The selected market makers can include all market makers, all traditional market makers, all electronic change networks (ECNs), all regional exchanges, all non-ECNs, one particular market maker or a user selected combination of market makers.

A volume filter (e.g., as selected using a drop down menu 208) can also be applied. For example, the system 10 can filter the displayed information such that symbols having a traded volume below a specified volume threshold are not shown in the table 174.

A price filter (e.g., as selected using a drop down menu 210) can also be applied. For example, the system 10 can filter the displayed information such that symbols having a trade price below a specified price threshold (e.g., for a prior trading session or the current trading session) are excluded from display in the table 174.

As indicated, the insiders montage mode is used to display statistics calculated by the system 10 that are indicative of a market maker's persistence at the inside market. More specifically, when a market maker desires to add a position, that market maker needs to be one of the most aggressive bidders. Conversely, when a market maker desires to sell a position, the market maker needs to be one of the most aggressive offering market makers for that security. In some situations, a market maker may desire to conceal activity relating to one or more securities by only placing orders of small volumes persistently at or near the inside market. As an example, over the course of three days in the year 2000, Goldman Sachs sold off a very large position in World Com (ticker symbol WCOM) stock by offering 1,000 or fewer shares at a time at prices that were at or near the lowest ask price. The insider mode is intended to assist in apprizing the user of this type of aggressive purchase or sell action by one or more market makers.

The time percentage columns 200 and 202 can be used to display a market maker persistence statistic akin to a moving average, or exponential smoothing, to track market maker presence at the inside market. The persistence statistic is expressed as a percentage and is approximately the percentage of the time a particular market maker has had the most aggressive bid or the most aggressive ask for any particular security over a specified period of time. The persistence statistic can be calculated for each security and market maker pair over any period of time, such as a three-minute interval or a fifteen minute interval. The time percentage persistence statistic is discussed in greater detail in the above-mentioned U.S. patent application Ser. No. 10/167,950 and will not be described in greater detail herein.

As indicated, a top player statistic for bids and asks can be kept for each security/market maker pair. The bid top player statistic is a numerical count of how many times the corresponding market maker placed a bid at the inside bid during the current trading session for the corresponding security, and can be displayed in column 180. The ask top player statistic is a numerical count of how many times the corresponding market maker placed an ask at the inside ask during the current trading session for the corresponding security, and can be displayed in column 182. Each of the bid top player and the ask top player statistics can start with a zero value at the beginning of each trading session and the values are incremented as the trading session progresses and the market makers place orders having an inside price. As should be appreciated, there can be more than one market maker having an inside bid and/or an inside ask at any given time.

As used herein, the term "hatchet" is given to a market maker when that market maker is the only market maker having an order at an inside price for a particular security. Statistics regarding hatchet-type activity for each security/market maker pair can be kept for both bids and asks. For example, a first bid hatchet (column 184) is a numerical count of how many times the corresponding market maker is the first market maker to post an inside bid that is higher than the immediately preceding inside bid for the corresponding security. In an alternative embodiment, the first bid hatchet can be a numerical count of how many times the corresponding market maker is the first market maker to post an inside bid that is higher than all previous inside bids for the trading session and for the corresponding security. Similarly, a first ask hatchet (column 186) is a numerical count of how many times the corresponding market maker is the first market maker to post an inside ask that is lower than the immediately preceding inside ask for the corresponding security. In an alternative embodiment, the first ask hatchet can be a numerical count of how many times the corresponding market maker is the first market maker to post an inside ask that is lower than all previous inside asks for the trading session and for the corresponding security. As should be appreciated, when a market maker becomes the first bid hatchet or the first ask hatchet for a given security, that market maker will also have their corresponding top player statistic incremented. As should also be appreciated, the first bid hatchet and the first ask hatchet for a given security may be subsequently joined by other market makers at the inside price established by the hatcheting market maker. These joining market makers will have their corresponding top player statistics incremented.

Column 188 can be used to display a last bid hatchet statistic, which is a numerical count of how many times the corresponding market maker is the last market maker to leave an inside bid price for the corresponding security. In one embodiment, as a prerequisite to being the last bid hatchet, there must have been two or more market makers at the inside bid price. As the market makers drop from the inside bid by one of satisfaction of their order, expiration of their bid or lowering their bid, the remaining market maker is the last bid hatchet and will have their corresponding last bid hatchet value incremented. Should the inside bid price move to a higher price while there are multiple market makers at the inside bid, no market maker will have their last bid hatchet statistic incremented for the security.

Column 190 can be used to display a last ask hatchet statistic, which is a numerical count of how many times the corresponding market maker is the last market maker to leave an inside ask price for the corresponding security. In one embodiment, as a prerequisite to being the last ask hatchet, there must have been two or more market makers at the inside ask price. As the market makers drop from the inside ask by one of satisfaction of their order, expiration of their ask or raising their ask, the remaining market maker is the last ask hatchet and will have their corresponding last ask hatchet value incremented. Should the inside ask price move to a lower price while there are multiple market makers at the inside ask, no market maker will have their last ask hatchet statistic incremented for the security.

Column 192 can be used to display a total bid hatchet statistic, which can be a sum of the corresponding first bid hatchet value from column 184 and a the corresponding last bid hatchet value from column 188. Column 194 can be used to display a total ask hatchet statistic, which can be a sum of the corresponding first ask hatchet value from column 186 and a the corresponding last ask hatchet value from column 190.

Each of the hatchet statistic values described herein can start with a zero value at the beginning of each trading session and the values are incremented as the trading session progresses.

As with the foregoing statistics of the insiders montage mode, the trade percentage statistics of column 196 (for bids) and column 198 (for asks) are intended to be indicators of insider activity. For each security/market maker pair and separately for bids and asks, the trade percentage statistics are an approximate percentage of the last predetermined number of trades that the corresponding market maker was at the inside price. In one embodiment, the predetermined number of trades is one hundred eighty, but can be changed to reflect a larger or smaller number of trades. The trade percentage statistics can be calculated using any suitable technique, including a simple moving average, an exponential moving average, a weighted moving average, a linear regression, or other mathematical averaging technique. A relatively high trade percentage statistic value is an indicator that the corresponding market maker is involved with a high percent of the trades for the corresponding security. Therefore, from the trade percentage statistics, the market maker(s) having the most influence in activity for a particular security can be inferred.

The trade percentage statistics can be calculated by assigning a value of one (1) to bids and asks having a price that this the same as the trade price. Otherwise, the bids and asks are given a value of zero (0). In one embodiment, the bid values for each market maker and each security are tracked over the predetermined number of trades and converted into a percentage by numerically summing all of the bid values assigned to each market maker on a security by security basis and dividing that number by the predetermined number of trades. The ask values for each market maker and each security are tracked over the predetermined number of trades and converted into a percentage by numerically summing all of the ask values assigned to each market maker on a security by security basis and dividing that number by the predetermined number of trades.

According to another embodiment of the invention, an exponentially smoothed trade persistence percentage is calculated by separately summing each bid or ask according to an exponential average where the current sum of all values ($\Sigma VALc$) is calculated according to equation 2 as follows:

$$\sum VAL_c = \left( \sum VAL_p + \frac{CV - \sum VAL_p}{m} \right) \quad \text{Eq. 2}$$

In equation 2, m is the predetermined number of trades, CV is the current value assigned to the marker maker (one or zero) and $\Sigma VALp$ is the prior sum of all values calculated according to equation 2 one trade earlier. The $\Sigma VALc$ value is multiplied by 100 to arrive at a percentage, that percentage representing the exponential average of the aggregation of each bid or ask value for the market maker for a selected security over the number of trades of interest. Equation 2 is solved separately for bid and ask values.

CONCLUSION

Although particular embodiments of the invention have been described in detail, it is understood that the invention is not limited correspondingly in scope, but includes all changes, modifications and equivalents coming within the spirit and terms of the claims appended hereto.

What is claimed is:

1. A method of tracking a plurality of symbols relating to securities traded on at least one common exchange, comprising:
   receiving with an electronic data receiver a dynamically updated data stream containing level 1 data relating to the plurality of symbols traded over the at least one exchange, the level 1 data including at least a current trade price of each symbol; and
   determining for each symbol in a set of symbols with an electronic processor configured to execute logic at least one of:
     an upward price movement indicator by dividing a count of the number of times the symbol achieves a new intra-session high by an intra-session trading price range, and
     a downward price movement indicator by dividing a count of the number of times the symbol achieves a new intra-session low by the intra-session price range, and
   wherein the determined movement indicators function as indicators of temporary imbalance in trade activity for the corresponding symbols.

2. The method according to claim 1, wherein at least one of the upward price movement indicator and the downward price movement indicator is updated to correspond to content of the updated data stream.

3. The method according to claim 1, further comprising displaying on a computer system display at least one of the upward price movement indicator and the downward price movement indicator in at least one of a table or a chart for each corresponding symbol.

4. The method according to claim 3, further comprising dynamically sorting with the processor the at least one of the table or the chart based on a parameter selected by the user.

5. The method according to claim 1, further comprising filtering the data stream with the processor for each symbol based on traded volume.

6. The method according to claim 1, further comprising filtering the data stream with the processor for each symbol based on traded price.

7. The method according to claim 1, further comprising waiting a specified period of time after the beginning of the session to commence the determining.

8. A method of tracking a plurality of symbols relating to securities traded on at least one common exchange, comprising:
   receiving with an electronic data receiver a dynamically updated data stream containing level 1 data relating to the plurality of symbols traded over the at least one exchange, the level 1 data including at least a current trade price of each symbol; and
   determining for each symbol in a set of symbols with an electronic processor configured to execute logic at least one of:
     a high opening balance range extension by subtracting a high trade price established during an opening balance delay interval from a current high trade price, and
     a low opening balance range extension by subtracting a current low trade price from a low trade price established during the opening balance delay interval.

9. The method according to claim 8, wherein at least one of the high opening balance range extension and the low opening balance range extension is updated to correspond to content of the updated data stream.

10. The method according to claim 8, further comprising displaying on a computer system display at least one of the high opening balance range extension and the low opening balance range extension in at least one of a table or a chart for each corresponding symbol.

11. The method according to claim 10, further comprising dynamically sorting with the processor the at least one of the table or the chart based on a parameter selected by the user.

12. The method according to claim 8, further comprising filtering the data stream with the processor for each symbol based on traded volume.

13. The method according to claim 8, further comprising filtering the data stream with the processor for each symbol based on traded price.

14. The method according to claim 8, further comprising waiting a specified period of time after the beginning of the session to commence the determining.

15. The method according to claim 8, further comprising deriving for each symbol in the set of symbols with the processor at least one of:
a high opening balance range extension percentage by dividing the corresponding high opening balance range extension value by a current trading session price range, and
a low opening balance range extension percentage by dividing the corresponding low opening balance range extension value by the current trading session price range.

16. The method according to claim 15, wherein at least one of the high opening balance range extension percentage and the low opening balance range extension percentage is updated to correspond to content of the updated data stream.

17. The method according to claim 15, further comprising displaying on a computer system display at least one of the high opening balance range extension percentage and the low opening balance range extension percentage in at least one of a table or a chart for each corresponding symbol.

18. The method according to claim 17, further comprising dynamically sorting with the processor the at least one of the table or the chart based on a parameter selected by the user.

19. The method according to claim 15, further comprising filtering the data stream with the processor for each symbol based on traded volume.

20. The method according to claim 15, further comprising filtering the data stream with the processor for each symbol based on traded price.

21. The method according to claim 15, further comprising waiting a specified period of time after the beginning of the session to commence the analyzing.

22. A method of tracking activity of a plurality of market makers relating to securities traded on at least one common exchange where the market makers place bids and asks, comprising:
receiving with an electronic data receiver a dynamically updated data stream containing level 1 and level 2 data relating to a plurality of securities traded over the at least one exchange, the level 1 data including at least a current trade price of each security and the level 2 data containing a bid price, a bid time, a bid volume, a security identifier, and a market maker identifier for each bid, and an ask price, an ask volume, an ask time, a security identifier and a market maker identifier for each ask; and
determining for each symbol and market maker pair from a set of symbols and a set of market makers with an electronic processor configured to execute logic at least one of:
a bid persistence statistic by approximating a percentage of a predetermined number trades for which the market maker had an inside bid price; and
an ask persistence statistic by approximating a percentage of a predetermined number of trades for which the market maker has an inside ask price; and
wherein the bid and ask persistence statistics function as indicators of a temporary imbalance in market maker activity for at least one of the symbols.

23. The method according to claim 22, further comprising displaying on a computer system display at least one of the bid persistence statistic and the ask persistence statistic in at least one of a table or a chart for each corresponding symbol and market maker pair.

24. The method according to claim 23, further comprising dynamically sorting with the processor the at least one of the table or the chart based on a parameter selected by the user.

25. The method according to claim 22, further comprising filtering the data stream with the processor for each symbol based on traded volume.

26. The method according to claim 22, further comprising filtering the data stream with the processor for each symbol based on traded price.

27. The method according to claim 22, wherein the bid persistence statistic and the ask persistence statistic are respectively calculated by:
assigning a value of one to each order at the inside market, otherwise assigning a value of zero to the order; and
separately solving the equation:

$$\left(\sum VAL_p + \frac{CV - \sum VAL_p}{m}\right)$$

for bid orders and ask orders, wherein m is the predetermined number of trades, CV is the current value assigned to the order and $\Sigma VAL_P$ is the prior sum of all values calculated according to the equation one trade earlier.

28. The method according to claim 27, further comprising multiplying the respective bid order and ask order results of the equation by one hundred to arrive at respective representations of exponential averages.

29. The method according to claim 22, wherein the bid persistence statistic and the ask persistence statistic are respectively calculated as one of a simple moving average, an exponential moving average, a weighted moving average, a linear regression, or mathematical averaging technique.

30. A system to track a plurality of symbols relating to securities traded on at least one common exchange, comprising:
an electronic data receiver that receives a dynamically updated data stream containing level 1 data relating to the plurality of symbols traded over the at least one exchange, the level 1 data including at least a current trade price of each symbol; and
an electronic processor configured to execute logic and configured to determine for each symbol in a set of symbols at least one of:
an upward price movement indicator by dividing a count of the number of times the symbol achieves a new intra-session high by an intra-session trading price range, and
a downward price movement indicator by dividing a count of the number of times the symbol achieves a new intra-session low by the intra-session price range; and wherein the determined movement indicators function as indicators of temporary imbalance in trade activity for the corresponding symbols.

31. The system according to claim 30, wherein the processor is configured to update at least one of the upward price movement indicator and the downward price movement indicator to correspond to content of the updated data stream.

32. The system according to claim 30, further comprising a display that displays at least one of the upward price movement indicator and the downward price movement indicator in at least one of a table or a chart for each corresponding symbol.

33. The system according to claim 32, wherein the processor is configured to dynamically sort the at least one of the table or the chart based on a parameter selected by the user.

34. The system according to claim 30, wherein the processor is configured to filter the data stream for each symbol based on traded volume.

35. The system according to claim 30, wherein the processor is configured to filter the data stream for each symbol based on traded price.

36. The system according to claim 30, wherein the processor is configured to wait a specified period of time after the beginning of the session to commence the determining.

37. A system to track a plurality of symbols relating to securities traded on at least one common exchange, comprising:
an electronic data receiver that receives a dynamically updated data stream containing level 1 data relating to the plurality of symbols traded over the at least one exchange, the level 1 data including at least a current trade price of each symbol; and
an electronic processor configured to execute logic and configured to determine for each symbol in a set of symbols at least one of:
a high opening balance range extension by subtracting a high trade price established during an opening balance delay interval from a current high trade price, and
a low opening balance range extension by subtracting a current low trade price from a low trade price established during the opening balance delay interval.

38. The system according to claim 37, wherein the processor is configured to update at least one of the high opening balance range extension and the low opening balance range extension to correspond to content of the updated data stream.

39. The system according to claim 37, further comprising a display that displays at least one of the high opening balance range extension and the low opening balance range extension in at least one of a table or a chart for each corresponding symbol.

40. The system according to claim 39, wherein the processor is configured to dynamically sort the at least one of the table or the chart based on a parameter selected by the user.

41. The system according to claim 37, wherein the processor is configured to filter the data stream for each symbol based on traded volume.

42. The system according to claim 37, wherein the processor is configured to filter the data stream for each symbol based on traded price.

43. The system according to claim 37, wherein the processor is configured to wait a specified period of time after the beginning of the session to commence the determining.

44. The system according to claim 37, wherein the processor is configured to derive for each symbol at least one of:
a high opening balance range extension percentage by dividing the corresponding high opening balance range extension value by a current trading session price range, and
a low opening balance range extension percentage by dividing the corresponding low opening balance range extension value by the current trading session price range.

45. The system according to claim 44, wherein the processor is configured to update at least one of the high opening balance range extension percentage and the low opening balance range extension percentage to correspond to content of the updated data stream.

46. The system according to claim 44, further comprising a display that displays at least one of the high opening balance range extension percentage and the low opening balance range extension percentage in at least one of a table or a chart for each corresponding symbol.

47. The system according to claim 46, wherein the processor is configured to dynamically sort the at least one of the table or the chart based on a parameter selected by the user.

48. The system according to claim 44, wherein the processor is configured to filter the data stream for each symbol based on traded volume.

49. The system according to claim 44, wherein the processor is configured to filter the data stream for each symbol based on traded price.

50. The system according to claim 44, wherein the processor is configured to wait a specified period of time after the beginning of the session to commence the deriving.

51. A system to track activity of a plurality of market makers relating to securities traded on at least one common exchange where the market makers place bids and asks, comprising:
an electronic data receiver that receives a dynamically updated data stream containing level 1 and level 2 data relating to a plurality of securities traded over the at least one exchange, the level 1 data including at least a current trade price of each security and the level 2 data containing a bid price, a bid time, a bid volume, a security identifier, and a market maker identifier for each bid, and an ask price, an ask volume, an ask time, a security identifier and a market maker identifier for each ask; and
an electronic processor configured to execute logic and configured to determine for each symbol and market maker pair from a set of symbols and a set of market makers at least one of:
a bid persistence statistic by approximating a percentage of a predetermined number trades for which the market maker had an inside bid price; and
an ask persistence statistic by approximating a percentage of a predetermined number of trades for which the market maker has an inside ask price
wherein the bid and ask persistence statistics function as indicators of a temporary imbalance in market maker activity for at least one of the symbols.

52. The system according to claim 51, further comprising a display that displays at least one of the bid persistence statistic and the ask persistence statistic in at least one of a table or a chart for each corresponding symbol and market maker pair.

53. The system according to claim 51, wherein the processor is configured to dynamically sort the at least one of the table or the chart based on a parameter selected by the user.

54. The system according to claim 51, wherein the processor is configured to filter the data stream for each symbol based on traded volume.

55. The system according to claim 51, wherein the processor is configured to filter the data stream for each symbol based on traded price.

56. The system according to claim 51, wherein to determine the bid persistence statistic and the ask persistence statistic the processor:
assigns a value of one to each order at the inside market, otherwise assigning a value of zero to the order; and
separately solves the equation:

$$\left(\sum VAL_p + \frac{CV - \sum VAL_p}{m}\right)$$

for bid orders and ask orders, wherein m is the predetermined number of trades, CV is the current value assigned to the order and $\Sigma VAL_P$ is the prior sum of all values calculated according to the equation one trade earlier.

57. The system according to claim 56, wherein the processor is configured to multiply the respective bid order and ask order results of the equation by one hundred to arrive at respective representations of exponential averages.

58. The system according to claim 51, wherein the bid persistence statistic and the ask persistence statistic are respectively calculated as one of a simple moving average, an exponential moving average, a weighted moving average, a linear regression, or mathematical averaging technique.

59. A method of tracking a plurality of symbols relating to securities traded on at least one common exchange, comprising:
receiving with an electronic data receiver a dynamically updated data stream containing level 1 data relating to the plurality of symbols traded over the at least one exchange, the level 1 data containing a trade price, a trade time, a trade volume and a security identifier including at least a current trade price of each symbol; and
tracking on a symbol by symbol basis for a set of symbols with a processor configured to execute logic at least one statistic selected from a number of trades at a first time period as compared to a number of trades at a second time period, a trade volume of shares at the first time period as compared to a trade volume of shares at the second time period, a volume of shares per trade at the first time period as compared to a volume of shares per trade at the second time period,
wherein a relationship of the tracked statistic for the first and second time periods is indicative of a temporary imbalance in trade activity for at least one of the symbols.

60. The method according to claim 59, further comprising displaying with a display at least one of the tracked statistics in at least one of a table or a chart for each corresponding symbol.

61. The method according to claim 59, further comprising for at least one of the tracked statistics calculating with the processor an average of the tracked statistic per unit of time over the respective time periods.

62. The method according to claim 59, wherein the first and the second time periods are from the current trading session.

63. The method according to claim 59, wherein the first time period is from the current trading session and the second time period is selected from one of a previous trading session or an average of multiple trading sessions.

64. The method according to claim 59, wherein the tracked statistics are updated based on contents of the data stream at regular intervals.

65. The method according to claim 64, wherein each interval corresponds to a unit of time and, after each interval elapses, the tracked statistics are updated based on data from the most recent intervals that in total corresponds respectively to a length of the first time period and a length of the second time period.

66. The method according to claim 59, wherein the tracked statistics are updated as a moving average.

67. The method according to claim 59, further comprising displaying with a display for each corresponding symbol in at least one of a table or a chart at least one of a difference between the number of trades for the first time period and the number of trades for the second time period.

68. The method according to claim 59, further comprising displaying with a display for each corresponding symbol in at least one of a table or a chart at least one of a difference between the trade volume for the first time period and the trade volume for the second period.

69. The method according to claim 59, further comprising displaying with a display for each corresponding symbol in at least one of a table or a chart at least one of a difference between the volume per trade for the first time period and the volume per trade for the second time period.

70. The method according to claim 59, further comprising displaying with a display for each corresponding symbol in at least one of a table or a chart at least one of a difference between an average number of trades per unit of time for the first time period and an average number of trades per unit of time for the second time period.

71. The method according to claim 59, further comprising displaying with a display for each corresponding symbol in at least one of a table or a chart at least one of a difference between an average of the trade volume per unit of time for the first time period and an average of the trade volume per unit of time for the second time period.

72. A system to track a plurality of symbols relating to securities traded on at least one common exchange, comprising:
an electronic data receiver that receives a dynamically updated data stream containing level 1 data relating to the plurality of symbols traded over the at least one exchange, the level 1 data containing a trade price, a trade time, a trade volume and a security identifier including at least a current trade price of each symbol; and
an electronic processor configured to execute logic to track on a symbol by symbol basis for a set of symbols at least one statistic selected from a number of trades at a first time period as compared to a number of trades at a second time period, a trade volume of shares at the first time period as compared to a trade volume of shares at the second time period, a volume of shares per trade at the first time period as compared to a volume of shares per trade at the second time period,
wherein a relationship of the tracked statistic for the first and second time periods is indicative of a temporary imbalance in trade activity for at least one of the symbols.

73. The system according to claim 72, further comprising a display that displays at least one of the tracked statistics in at least one of a table or a chart for each corresponding symbol.

74. The system according to claim 72, wherein the processor is further configured for at least one of the tracked statistics to calculate an average of the tracked statistic per unit of time over the respective time periods.

75. The system according to claim 72, wherein the first and the second time periods are from the current trading session.

76. The system according to claim 72, wherein the first time period is from the current trading session and the second time period is selected from one of a previous trading session or an average of multiple trading sessions.

77. The system according to claim 72, wherein the electronic processor is further configured to update the tracked statistics based on contents of the data stream at regular intervals.

78. The system according to claim 77, wherein each interval corresponds to a unit of time and, after each interval elapses, the tracked statistics are updated based on data from the most recent intervals that in total corresponds respectively to a length of the first time period and a length of the second time period.

79. The system according to claim 72, wherein electronic processor is further configured to update the tracked statistics as a moving average.

80. The system according to claim 72, further comprising a display that displays for each corresponding symbol in at least one of a table or a chart at least one of a difference between the number of trades for the first time period and the number of trades for the second time period.

81. The system according to claim 72, further comprising a display that displays for each corresponding symbol in at least one of a table or a chart at least one of a difference between the trade volume for the first time period and the trade volume for the second period.

82. The system d according to claim 72, further comprising a display that displays for each corresponding symbol in at least one of a table or a chart at least one of a difference between the volume per trade for the first time period and the volume per trade for the second time period.

83. The system according to claim 72, further comprising a display that displays for each corresponding symbol in at least one of a table or a chart at least one of a difference between an average number of trades per unit of time for the first time period and an average number of trades per unit of time for the second time period.

84. The system according to claim 72, further comprising a display that displays for each corresponding symbol in at least one of a table or a chart at least one of a difference between an average of the trade volume per unit of time for the first time period and an average of the trade volume per unit of time for the second time period.

* * * * *